United States Patent
Zhang et al.

(10) Patent No.: US 11,467,303 B2
(45) Date of Patent: Oct. 11, 2022

(54) IDENTIFYING GEOLOGIC FEATURES IN A SUBTERRANEAN FORMATION USING A POST-STACK SEISMIC DIFFRACTION IMAGING CONDITION

(71) Applicant: Saudi Arabian Oil Company, Dhahran (SA)

(72) Inventors: Dongliang Zhang, Khobar (SA); Constantinos Tsingas, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 204 days.

(21) Appl. No.: 16/813,231

(22) Filed: Mar. 9, 2020

(65) Prior Publication Data
US 2021/0278558 A1 Sep. 9, 2021

(51) Int. Cl.
- G01V 1/28 (2006.01)
- G01V 1/34 (2006.01)
- G01V 1/36 (2006.01)

(52) U.S. Cl.
CPC .............. *G01V 1/345* (2013.01); *G01V 1/364* (2013.01); *G01V 2210/242* (2013.01); *G01V 2210/74* (2013.01)

(58) Field of Classification Search
CPC .. G01V 1/345; G01V 1/364; G01V 2210/242; G01V 2210/74
See application file for complete search history.

(56) References Cited

U.S. PATENT DOCUMENTS

| | | | |
|---|---|---|---|
| 493,339 | A | 3/1893 | Phillips |
| 1,028,012 | A | 5/1912 | Foster |
| 3,441,631 | A | 4/1969 | Fernald et al. |
| 3,502,741 | A | 3/1970 | Fernald et al. |
| 3,688,249 | A | 8/1972 | Backus et al. |
| 3,691,529 | A | 9/1972 | Pizante |

(Continued)

FOREIGN PATENT DOCUMENTS

| | | |
|---|---|---|
| CN | 105093301 | 11/2015 |
| CN | 106154319 | 11/2016 |

(Continued)

OTHER PUBLICATIONS

GCC Examination Report in GCC Appln. No. GC 2019-37569, dated Jun. 6, 2021, 4 pages.

(Continued)

*Primary Examiner* — Mohamed Charioui
*Assistant Examiner* — Christine Y Liao
(74) *Attorney, Agent, or Firm* — Fish & Richardson P.C.

(57) ABSTRACT

A system for seismic imaging of a subterranean geological formation, the system includes a receiver configured to obtain seismic data comprising a data volume representing a post-stacked image. The system includes a filtering module configured to: apply frequency-wavenumber (F-K) filter to the data volume extract a negative-dip structure image and apply the frequency-wavenumber (F-K) filter to the data volume extract a positive-dip structure image. The system includes a diffraction rendering module configured to: multiply the positive-dip structure image with the negative-dip structure image and generate a diffraction-enhanced seismic image representing a geological formation of the data volume.

14 Claims, 29 Drawing Sheets

(56) References Cited

U.S. PATENT DOCUMENTS

| | | |
|---|---|---|
| 4,449,208 A | 5/1984 | Moeckel et al. |
| 4,562,540 A | 12/1985 | Devaney |
| 4,935,904 A | 6/1990 | Chambers et al. |
| 5,292,837 A | 3/1994 | Heinrich et al. |
| 6,767,975 B1 | 7/2004 | Liu |
| 7,085,195 B2 | 8/2006 | Taner et al. |
| 7,157,532 B2 | 1/2007 | Payer et al. |
| 7,196,969 B1 | 3/2007 | Karazincir |
| 7,373,252 B2 | 5/2008 | Sherrill et al. |
| 7,643,377 B1 | 1/2010 | Uzes |
| 7,970,546 B1 | 6/2011 | Peng |
| 8,116,168 B1 | 2/2012 | Luo et al. |
| 8,209,125 B2 | 6/2012 | Berkovitch et al. |
| 8,227,653 B2 | 7/2012 | Weber et al. |
| 8,248,886 B2 | 8/2012 | Neelannani et al. |
| 8,675,447 B2 | 3/2014 | Poole et al. |
| 8,803,878 B2 | 8/2014 | Andersen et al. |
| 8,948,463 B2 | 2/2015 | Landa et al. |
| 9,116,255 B2 | 8/2015 | Eick et al. |
| 9,128,205 B2 | 9/2015 | Guan et al. |
| 9,536,143 B2 | 1/2017 | Jiang et al. |
| 9,568,627 B2 | 2/2017 | Guigne et al. |
| 9,575,194 B2 | 2/2017 | Khalil et al. |
| 9,632,192 B2 | 4/2017 | Baina et al. |
| 9,633,472 B2 | 4/2017 | Thomas et al. |
| 9,651,694 B2 | 5/2017 | Zhang et al. |
| 9,696,445 B2 | 7/2017 | Kluver et al. |
| 9,702,997 B2 | 7/2017 | Sava et al. |
| 9,715,027 B2 | 7/2017 | Gersztenkorn et al. |
| 9,724,681 B2 | 8/2017 | Lucciulli et al. |
| 9,726,771 B1 | 8/2017 | Popovici et al. |
| 9,733,371 B2 | 8/2017 | Burnett et al. |
| 9,766,357 B2 | 9/2017 | Cha |
| 9,880,303 B2 | 1/2018 | Landa et al. |
| 9,896,392 B2 | 2/2018 | Meiswinkel et al. |
| 9,919,298 B2 | 3/2018 | Schmidt et al. |
| 10,022,698 B2 | 7/2018 | Shaikh et al. |
| 10,232,339 B2 | 3/2019 | Bischof et al. |
| 10,280,125 B2 | 5/2019 | Sogo et al. |
| 10,281,604 B2 | 5/2019 | Jing et al. |
| 10,295,685 B2 | 5/2019 | Zhang et al. |
| 10,310,113 B2 | 6/2019 | Sun et al. |
| 10,310,122 B2 | 6/2019 | Haacke et al. |
| 10,324,204 B1 | 6/2019 | Sturzu et al. |
| 10,557,954 B2 | 2/2020 | Tonellot et al. |
| 10,641,916 B2 | 5/2020 | Ozbek et al. |
| 10,889,533 B2 | 1/2021 | Melibari et al. |
| 10,928,533 B2 | 2/2021 | Ji et al. |
| 10,935,680 B2 | 3/2021 | Tsingas et al. |
| 11,029,431 B2 | 6/2021 | Zhang et al. |
| 11,041,970 B2 | 6/2021 | Zhang et al. |
| 2004/0152850 A1 | 8/2004 | Payer et al. |
| 2005/0219949 A1 | 10/2005 | Taner et al. |
| 2007/0203673 A1 | 8/2007 | Sherrill et al. |
| 2008/0285383 A1 | 11/2008 | An |
| 2010/0097888 A1 | 4/2010 | Neelamani et al. |
| 2010/0114494 A1 | 5/2010 | Higginbotham et al. |
| 2010/0131205 A1 | 5/2010 | Berkovitch et al. |
| 2010/0171740 A1 | 7/2010 | Andersen |
| 2012/0016097 A1 | 1/2012 | Weber et al. |
| 2012/0051176 A1 | 3/2012 | Liu |
| 2012/0163121 A1* | 6/2012 | Hardage ............... G01V 1/38 367/21 |
| 2012/0300584 A1 | 11/2012 | Eick et al. |
| 2012/0307591 A1 | 12/2012 | Hegna et al. |
| 2013/0060476 A1 | 3/2013 | Thomson |
| 2013/0077832 A1* | 3/2013 | Landa ............... G01V 1/28 382/109 |
| 2013/0176819 A1 | 7/2013 | Poole |
| 2014/0032119 A1 | 1/2014 | Landa et al. |
| 2014/0133275 A1 | 3/2014 | Guan et al. |
| 2014/0149046 A1 | 5/2014 | Baina et al. |
| 2014/0269183 A1 | 9/2014 | Kluver et al. |
| 2014/0293744 A1 | 10/2014 | Zhang |
| 2014/0321713 A1 | 10/2014 | Sava et al. |
| 2014/0328140 A1 | 11/2014 | Khalil et al. |
| 2015/0063066 A1 | 3/2015 | Burnett et al. |
| 2015/0103623 A1 | 4/2015 | Gersztenkorn |
| 2015/0112601 A1 | 4/2015 | Ozbek |
| 2015/0124559 A1* | 5/2015 | Cha ............... G01V 1/362 367/7 |
| 2015/0170411 A1 | 6/2015 | Thomas |
| 2015/0203418 A1 | 7/2015 | Meiswinkel et al. |
| 2015/0235081 A1 | 8/2015 | Jiang et al. |
| 2015/0331123 A1 | 11/2015 | Guigne et al. |
| 2016/0091624 A1 | 3/2016 | Haacke et al. |
| 2016/0325274 A1 | 11/2016 | Schmidt |
| 2016/0334526 A1 | 11/2016 | Pica |
| 2016/0341837 A1 | 11/2016 | Eick |
| 2016/0367977 A1 | 12/2016 | Shaikh et al. |
| 2017/0001182 A1 | 1/2017 | Schmidt et al. |
| 2017/0007994 A1 | 1/2017 | Lucciulli et al. |
| 2017/0097428 A1 | 4/2017 | Sun |
| 2017/0151547 A1 | 6/2017 | Shaik et al. |
| 2017/0197892 A1 | 7/2017 | Khawaji |
| 2018/0164452 A1* | 6/2018 | Oukili ............... G01V 1/38 |
| 2018/0239041 A1 | 8/2018 | Tsingas et al. |
| 2018/0292554 A1 | 10/2018 | Zhang et al. |
| 2018/0327332 A1 | 11/2018 | Sogo et al. |
| 2018/0345243 A1 | 12/2018 | Bischof et al. |
| 2018/0356547 A1 | 12/2018 | Tonellot et al. |
| 2019/0092707 A1 | 3/2019 | Melibari et al. |
| 2019/0179044 A1 | 6/2019 | Zhang et al. |
| 2019/0179045 A1 | 6/2019 | Zhang et al. |
| 2019/0353812 A1* | 11/2019 | Zhang ............... G01V 1/282 |
| 2020/0341160 A1 | 10/2020 | Ji et al. |
| 2021/0063570 A1 | 3/2021 | Liu et al. |
| 2021/0181364 A1 | 6/2021 | Zhang et al. |
| 2021/0215842 A1 | 7/2021 | Liu et al. |

FOREIGN PATENT DOCUMENTS

| | | |
|---|---|---|
| CN | 109307890 | 2/2019 |
| EP | 0109341 | 2/1991 |
| EP | 3029491 | 6/2016 |
| GB | 2483997 | 3/2012 |
| WO | WO 2011154762 | 12/2011 |
| WO | WO 2013163131 | 10/2013 |
| WO | WO 2016156530 | 10/2016 |

OTHER PUBLICATIONS

Dafni et al., "Diffraction imaging by prestack reverse-time migration in the dip angle domain: diffraction imaging by reverse-time migration," Geophysical Prospecting, Oct. 2017, 65(14):295-316.

PCT International Search Report and Written Opinion in International Appln. No. PCT/US2020/049045, dated Dec. 15, 2020, 19 pages.

CN Office action in Chinese Appln. No. 201880037535.2, dated Apr. 30, 2021, 21 pages (With English Translation).

He et al., "Reflection waveform inversion with variable density." Journal of Applied Geophysics 170, 103827, Nov. 2019, 16 pages.

PCT International Search Report and Written Opinion in International Appln. No. PCT/US2021/012193, dated Apr. 20, 2021, 18 pages.

GCC Examination Report in GCC Appln. No. GC 2019-37569, dated Jun. 29, 2020, 4 pages.

PCT International Search Report and Written Opinion in International Appln. No. PCT/US2021/021484, dated Jun. 24, 2021, 13 pages.

Gulf Cooperation Council Examination Report issued in GCC Appln. No. GC 2018-35094 dated Mar. 4, 2020, 3 pages.

Bahorich and Farmer, "3D Seismic Discontinuity for Faults and Stratigraphic Features: the Coherence Cube," The Leading Edge, vol. 14, 1995, 6 pages.

Batany et al., "Adaptive multiple subtraction: Unification and Comparison of matching filters based on the lq-norm and statistical independence," Geophysics vol. 81, No. 1, Jan.-Feb. 2016, 13 pages.

Berkhout and Verschuur, "Estimation of multiple scattering by iterative inversion, Part I: Theoretical considerations," Geophysics vol. 62, No. 5, Sep.-Oct. 1997, 10 pages.

(56) References Cited

OTHER PUBLICATIONS

Chen and Fomel, "Random noise attenuation using local signal-and-noise orthogonalization," Geophysics vol. 80, No. 6, WD1-WD9, 2015, 19 pages.
Chen et al., "Directly imaging steeply-dipping fault zones in geothermal fields with multicomponent seismic data," Geothermics, vol. 57, Sep. 1, 2015, 31 pages.
Donno , "Improving multiple removal using least-squares dip filters and independent component analysis," Geophysics vol. 76, No. 5, Sep.-Oct. 2011, 14 pages.
Donno et al., "Curvelet-based multiple prediction," Geophysics vol. 75, No. 6, Nov.-Dec. 2010, 9 pages.
Fei et al., "An Endemic Problem in Reverse-Time Migration," 84th Annual International Meeting, SEG, Expanded Abstracts, Published in 2014, pp. 3811-3815.
Fei et al., "Removing False Images in Reverse-Time Migration: The Concept of De-Primary," Geophysics, vol. 80, No. 6, Nov.-Dec. 2015, pp. S237-S244.
Fletcher, "Suppressing Unwanted Internal Reflections in Prestack Reverse-Time Migration," Geophysics, vol. 71, No. 6, Nov.-Dec. 2006, pp. E79-E82.
Fomel, "Shaping regularization in geophysical-estimation problems," Geophysics vol. 72, No. 2, Mar.-Apr. 2007, 8 pages.
Fomel, "Theory of 3-D Angle Gathers in Wave-Equation Imaging," 74th Annual International Meeting, SEG, Expanded Abstracts, Oct. 2004, pp. 1053-1056.
Forestiere et al., "Oligomerization of Monoolefins by Homogenous Catalysts", Oil & Science and Technology Review de l'Institute Francais du Petrole, vol. 64, No. 6, Nov. 2009, pp. 663-664, 20 pages.
Guitton and Verschuur, "Adaptive subtraction of multiples using the L1-norm," Geophysical Prospecting, vol. 52, Issue 1, Jan. 2004, 12 pages.
Guitton, "Multiple attenuation in complex geology with a pattern-based approach," Geophysics vol. 70, No. 4, Jul.-Aug. 2005, 11 pages.
Herrmann et al., "Non-linear primary-multiple separation with directional curvelet frames," Geophysical Journal International vol. 170, Issue 2, Aug. 2007, 19 pages.
Hu et al., "Angle gathers from reverse time migration using analytic wavefield propagation and decomposition in the time domain," Geophysics, vol. 81, No. 1, Jan. 1, 2016, 9 pages.
Khaidukov et al., "Diffraction imaging by focusing-defocusing: An outlook on seismic superresolution," Geophysics, vol. 69, No. 6, Nov.-Dec. 2004, 13 pages.
Kim et al., "3D Least-Squares Reverse Time Migration Using Wavefield Decomposition via Hilbert transform," 79th EAGE Conference & Exhibition, Jun. 12, 2017, 5 pages.
Kim et al., "Increasing signal-to-noise ratio of marine seismic data: a case study from offshore Korea," Journal of Applied Geophysics, vol. 134, Nov. 2016.
Klokov et al., "Separation and imaging of seismic diffractions using migrated dip-angle gathers," Geophysics, vol. 77, No. 6, S131-S143.
Kong et al., "Diffraction separation by plane-wave prediction filtering," Chinese Geophysical Society, Appl. Geophys. (2017) 14: 399, Jul. 2017.
Landa et al., "Separation, imaging and velocity analysis of seismic diffractions using migrated dip-angle gathers," 78th Annual International Meeting, SEG, Expanded Abstracts, 2008, 5 pages.
Li and Lu, "Demultiple strategy combining Radon filtering and Radon domain adaptive multiple subtraction," Journal of Applied Geophysics, vol. 103, Apr. 2014, 11 pages.
Liu and Lu, "Diffraction Imaging Based on Dip Angle Gather of Seismic Wave Equation Migration," Near Surface Geophysics Asia Pacific Conference, Beijing, China, Jul. 17-19, 2013, 4 pages.
Liu et al., "An Effective Imaging Condition for Reverse-Time Migration using Wavefield Decomposition," Geophysics, vol. 76, No. 1, Jan. 2011, pp. S29-S39.
Liu et al., "Imaging diffractors using wave-equation migration," Geophysics, vol. 81, No. 6, Nov.-Dec. 2016, 10 pages.
Liu et al., "Reverse-Time Migration using One-Way Wavefield Imaging Condition," 77th Annual International Meeting, SEG Expanded Abstracts, published in 2007, pp. 2170-2174,.
Luo et al., "Edge-preserving smoothing and applications," The Leading Edge, vol. 21, 2002, 5 pages.
Mahdaviani, et al, "Selective Ethylene Dimerization Toward 1-butene by a New Highly Efficient Catalyst System and Determination of Its Optimum Operating Conditions in a Buchi Reactor," International Journal of Chemical Engineering and Applications, vol. 1, No. 3, Oct. 2010, pp. 276-281, 6 pages.
Popovici et al., "High resolution diffraction imaging of small scale fractures in scale and carbonate reservoirs," Unconventional Resources Technology Conference, 2015, 9 pages.
Qin et al., "Kirchhoff preSDM interactive dip-gather stacking and dip illumination panel generation," 75th Annual International Meeting, SEG, Expanded Abstracts, 2005, 5 pages.
Rickett et al., "P167—Adaptive multiple subtraction with non-stationary helical shaping filters," EAGE 63rd Conference and Technical Exhibition, Jun. 11-15, 2001, 4 pages.
Sava et al. "Angle-Domain Common Image Gathers by Wavefield Continuation Methods," Geophysics, 68, May-Jun. 2003, pp. 1065-1074.
Schoepp et al., "Multifocusing 3D diffraction imaging for detection of fractured zones in mudstone reservoirs: Case history," Interpretation 3(1), Feb. 2015, 12 pages.
Spitz, "Pattern recognition, spatial predictability and subtraction of multiple events," the Leading Edge, Jan. 1999, 4 pages.
Sturzu et al., "Diffraction imaging using specularity gathers," Journal Seismic Exploration, vol. 23, Feb. 2014, 18 pages.
Sun et al., "Comparative study of dip-angle domain Gaussian beam migration and Kirchhoff migration in diffraction separation," SEG Technical Program Expanded Abstracts, 2014, 5 pages.
Taner et al., "Separation and imaging of seismic diffractions using plane-wave decomposition," SEG Technical Program Expanded Abstracts, 25(1), Jan. 2006.
Ventosa et al., "Adaptive multiple subtraction with wavelet-base complex urary Wiener filters," Jun. 2018, published in Geophysics vol. 77, Nov.-Dec. 2012, 18 pages.
Verschuur et al., "Adaptive surface-related multiple elimination," Geophysics vol. 57, No. 9, Sep. 1992, 12 pages.
Wang et al., "RTM Artifact Removal Via a Fast Algorithm for Wavefield Decomposition," 2016 SEG International Exposition and 86th Annual Meeting, 2016.
Wang et al., "Up/down and P/S decompositions of elastic wavefields using complex seismic traces with applications to calculations Poynting vectors and angle-domain common-image gathers from reverse time migrations," Geophysics, vol. 81, No. 4, Jul. 1, 2016, 15 pages.
Wang, "Multiple subtraction using an expanded multichannel matching filter," Geophysics vol. 68, No. 1, Jan.-Feb. 2003, 9 pages.
Wiggins, "Multiple attenuation by explicit wave extrapolation to an interpreted horizon," the Leading Edge, Jan. 1999, 7 pages.
Xu et al., "3D Angle Gathers from Reverse-Time Migration," Geophysics, vol. 76, No. 2, Mar.-Apr. 2011, pp. S77-S92.
Xue et al., "Amplitude-preserving nonlinear adaptive multiple attenuation using the high order sparse Radon Transform," Sinopec Geophysical Research Institute, IOP Science, Journal of Geophysics and Engineering, vol. 31, No. 3, Apr. 2016, 2 pages.
Zhang and Zhang, "Diffraction imaging using shot and opening angle gathers: A prestack time migration approach," Geophysics, vol. 79, No. 2, Mar.-Apr. 2014, 11 pages.
Zhang et al, "Improving reverse time migration angle gathers by efficient wavefield separation," Geophysics, vol. 83, No. 2, Mar. 1, 2018, pp. S187-S195.
Zhang et al, "RTM angle gathers by optical flow with wavefield separation", SEG Technical Program Expanded Abstracts 2018, Aug. 27, 2018, 5 pages.
Zhang et al., "Efficient Wave-Equation-Based Diffraction Imaging," Geophysics, vol. 82, No. 5, Sep.-Oct. 2019, 11 pages.

(56) References Cited

OTHER PUBLICATIONS

Zhang, "RTM Angle Gathers and Specular Filter (SF) RTM using Optical Flow," 84rd Annual International Meeting, SEG, Expanded Abstracts, Copyright 2014, pp. 3816-3820.
Gulf Cooperation Council Examination Report issued in GCC Appln. No. GC 2018-35094 dated Nov. 7, 2019, 4 pages.
PCT International Search Report and Written Opinion in International Appln. No. PCT/US2019/031421, dated Aug. 5, 2019, 17 pages.
PCT International Search Report and Written Opinion issued in International Appln. No. PCT/US2018/049834, dated Dec. 20, 2018, 17 pages.
PCT International Search Report and Written Opinion issued in International Appln. No. PCT/US2018/026071, dated Jul. 9, 2018, 15 pages.
Gong et al., "Polarized Wavefield Magnitudes with Optical Flow for Elastic Angle-Domain Common-Image Gathers," Geophysics, Jul.-Aug. 2016, 81(4):S239-S251.
GCC Examination Report in GCC Appln. No. GC 2019-37569, dated Nov. 24, 2020, 5 pages.
PCT International Search Report and Written Opinion in International Appln. No. PCT/US2020/064511, dated Apr. 1, 2021, 17 pages.
Wang et al., "Reverse Time Migration with Hilbert Transform Based Full Wavefield Decomposition" Chinese Journal of Geophysics-Chinese Edition 59.11, Nov. 2016, 4200-4211, 12 pages.
Zhong et al., "Reverse Time Migration of Ground-Penetrating Radar with Full Wavefield Decomposition Based on the Hilbert Transform" Geophysical Prospecting 68.4, Apr. 2020, 1097-1112, 16 pages.
GCC Examination Report in GCC Appln. No. GC 2020-41105, dated Oct. 24, 2021, 6 pages.

\* cited by examiner

368

370

374

IDENTIFYING GEOLOGIC FEATURES IN A SUBTERRANEAN FORMATION USING A POST-STACK SEISMIC DIFFRACTION IMAGING CONDITION

TECHNICAL FIELD

The present disclosure generally relates to an approach for identifying geologic features in a subterranean formation.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features, for example, identification of potential petroleum reservoirs. Seismic surveys are conducted by using a controlled seismic source (for example, a seismic vibrator or dynamite) to create a seismic wave. The seismic source is typically located at ground surface. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from other sources, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

This disclosure describes systems and methods for a post-stack edge detection using a multiplication imaging condition to image subsurface geologic features using diffracted seismic waves. Performing seismic imaging using post-stack edge detection techniques enables a data processing system to identify geologic features of interest, such as isolated scatterers, reflector edges, fault surfaces, fracture zones, and erosional surfaces. Each of these features are often of high interest in seismic exploration.

The described implementations can provide various technical benefits. For instance, diffraction imaging can increase the spatial resolution of the seismic images beyond the conventional means to provide to the interpreters with high-resolution structural and stratigraphic sections. Generally, seismic data can be analyzed using pre-stack techniques and/or post-stack techniques. For example, there are two approaches for performing imaging diffraction with pre-stack seismic data. A first approach includes separating diffraction seismic data from reflection seismic data in the field recorded seismic data. Only the diffraction seismic data are then imaged to generate the diffraction image. A second approach includes using an imaging condition to separate the diffraction and diffraction image while imaging recorded seismic data. The two-way imaging condition is used instead of a one-way imaging condition because two-way imaging condition can save computation cost and provide wider illumination, as subsequently described.

Post-stack imaging of the seismic data can be less computationally intensive (and thus faster to compute) than pre-stack imaging of the seismic data. Therefore, it is desirable to perform post-stack migration where possible for seismic imaging of the geological environment. The systems and methods for post-stack edge detection enable high-fidelity imaging, similar to the pre-stack approaches described above, with a reduced computation time. To extend the multiplication imaging condition from the pre-stack to post-stack cases, a two dimensional (2D) frequency-wavenumber (F-K) filter is used. A data processing system, rather than using wavefield separation with pre-stack seismic data, uses the F-K filter to generate negative-dip and positive-dip structure images.

Generally, the F-K filters configured to generate the negative-dip and positive-dip structure images are applied to different data than pre-stack seismic data; rather, these filters generate structure data from post-stack seismic data. The stacked image can be generated by many different methods and is not limited to a wave equation-based method. At some stages, for example an interpreting stage, pre-stack data are not available, and the systems and processes of F-K filters can be applied to obtain the diffraction image.

Generally, diffraction responses generated at a reflector edge include all dip angle ranges. After the data processing system performs F-K filtering, the diffraction responses can exist in both negative-dip and positive-dip structure images. However, reflection responses can only exist in either negative-dip or positive-dip structure images. Therefore, the filtered negative-dip and positive-dip structure images are still needed for the multiplication imaging condition to generate an accurate edge image.

The methods and systems subsequently described can be extended to three dimensional (3D) cases. A first approach includes applying, by the data processing system, a 3D F-K filter to calculate four components with different dip and azimuth angles. After the four components are computed, the data processing system multiplies the extracted four components to generate the final edge detection image.

A second approach includes splitting a 3D data volume into 2D sections (e.g., slices). The data processing system applies 2D methodology to each section to generate an edge detection image.

In an aspect, a system for seismic imaging of a subterranean geological formation includes a receiver configured to obtain seismic data including a data volume representing a post-stacked image. The system includes a filtering module configured to apply frequency-wavenumber (F-K) filter to the data volume extract a negative-dip structure image and apply the frequency-wavenumber (F-K) filter to the data volume extract a positive-dip structure image. The system includes a diffraction rendering module configured to: multiply the positive-dip structure image with the negative-dip structure image and generate a diffraction-enhanced seismic image representing a geological formation of the data volume.

In some implementations, the F-K filter comprises a two dimensional (2D) F-K filter, and the filtering module is configured to iteratively apply the 2D F-K filter to a plurality of slices of a three dimensional data volume.

In some implementations, iteratively applying the 2D F-K filter to a plurality of slices of a three dimensional data volume includes splitting the data volume along an x-axis, a y-axis, and a z-axis into three portions; applying the 2D F-K filter to each portion of the three portions; and summing the three portions to generate the diffraction-enhanced seismic image.

In some implementations, the F-K filter comprises a three dimensional (3D) F-K filter. The filtering module is configured to extract a common image that exists among four dip components of the data volume. The filtering module is configured to apply the 3D F-K filter to extract a first component image from the data volume. The filtering module is configured to apply the 3D F-K filter to extract a second component image from the data volume. The filtering module is configured to apply the 3D F-K filter to extract a third component image from the data volume. The filtering module is configured to apply the 3D F-K filter to extract a fourth component image from the data volume. The diffraction rendering module configured to multiply the first component image, the second component image, the third component image, and the fourth component image and generate the diffraction-enhanced seismic image representing a geological formation of the data volume.

In some implementations, generating the diffraction-enhanced seismic image is independent from separating reflection portions from diffraction portions of the seismic data.

In some implementations, the diffraction-enhanced seismic image includes an increased field of illumination with respect to a seismic image generated independent from multiplying the positive-dip imaging condition and the negative-dip imaging condition. In some implementations, the diffraction rendering module is configured to render the diffraction-enhanced seismic image for presentation on a user interface.

In a general aspect, a process for seismic imaging of a subterranean geological formation includes obtaining, by a receiver, seismic data including a data volume representing a post-stacked image. The process includes applying, by a filtering module, a frequency-wavenumber (F-K) filter to the data volume extract a negative-dip structure image. The process includes applying, by a filtering module, the frequency-wavenumber (F-K) filter to the data volume extract a positive-dip structure image. The process includes multiplying, by a diffraction rendering module, the positive-dip structure image with the negative-dip structure image. The process includes and generating, by the diffraction rendering module, a diffraction-enhanced seismic image representing a geological formation of the data volume.

In some implementations, the F-K filter comprises a two dimensional (2D) F-K filter, and the process includes iteratively applying the 2D F-K filter to a plurality of slices of a three dimensional data volume.

In some implementations, iteratively applying the 2D F-K filter to a plurality of slices of a three-dimensional data volume includes splitting the data volume along an x-axis, a y-axis, and a z-axis into three portions, applying the 2D F-K filter to each portion of the three portions, and summing the three portions to generate the diffraction-enhanced seismic image.

In some implementations, the F-K filter comprises a three dimensional (3D) F-K filter. The process includes extracting a common image that exists among four dip components of the data volume. The process includes applying the 3D F-K filter to extract a first component image from the data volume. The process includes applying the 3D F-K filter to extract a second component image from the data volume. The process includes applying the 3D F-K filter to extract a third component image from the data volume. The process includes applying the 3D F-K filter to extract a fourth component image from the data volume. The process includes multiplying the first component image, the second component image, the third component image, and the fourth component image and generating the diffraction-enhanced seismic image representing a geological formation of the data volume.

In some implementations, generating the diffraction-enhanced seismic image is independent from separating reflection portions from diffraction portions of the seismic data.

In a general aspect, one or more non-transitory computer readable media storing instructions are configured to cause the at least one processing device to perform operations for seismic imaging of a subterranean geological formation, the operations include obtaining, by a receiver, seismic data including a data volume representing a post-stacked image. The process includes applying, by a filtering module, a frequency-wavenumber (F-K) filter to the data volume extract a negative-dip structure image. The process includes applying, by a filtering module, the frequency-wavenumber (F-K) filter to the data volume extract a positive-dip structure image. The process includes multiplying, by a diffraction rendering module, the positive-dip structure image with the negative-dip structure image. The process includes and generating, by the diffraction rendering module, a diffraction-enhanced seismic image representing a geological formation of the data volume.

The details of one or more embodiments are set forth in the accompanying drawings and the description below. Other features and advantages will be apparent from the description and drawings, and from the claims.

DETAILED DESCRIPTION

Figure 1:
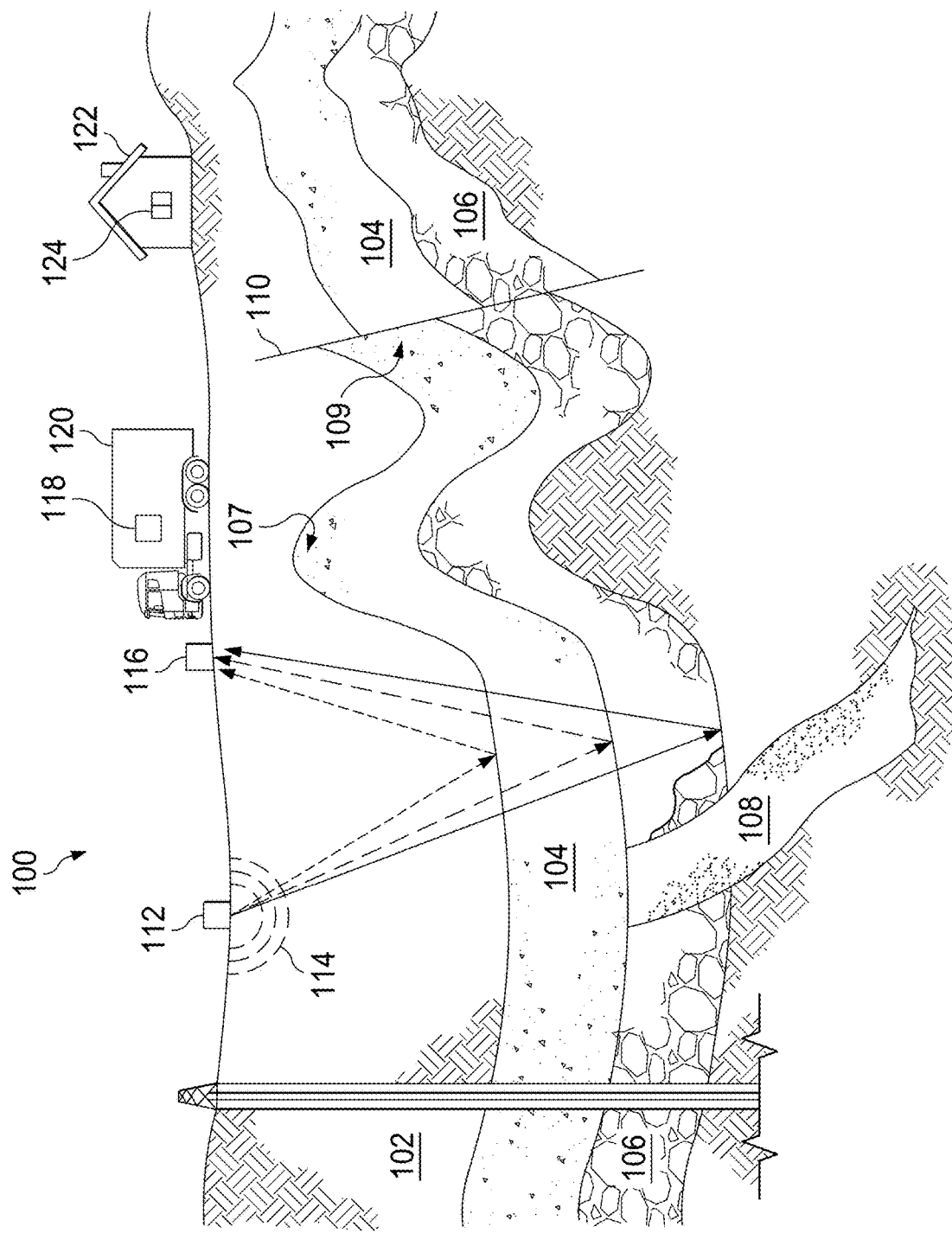
FIG. 1 is a schematic view of a seismic survey being performed to map subterranean features such as facies and faults.

Generally, reflections and diffractions are the main seismic signal events providing subsurface information. Seismic imaging and inversion of reflections are the workflows in the industry to reveal subsurface geologic structure and stratigraphy and to generate rock properties for reservoir characterization. Although diffractions are generally weaker than reflections, diffraction imaging and inversion provides equally important subsurface information. Moreover, diffractions can be used for high resolution seismic imaging beyond the classical Rayleigh limit. Diffraction-enhanced seismic sections assist and contribute significantly in the interpretation and identification of small-scale faults and fractures, and they are used in addition to other derived post-stack attributes such as coherency and curvature cubes.

Diffraction imaging techniques can generally be separated into two main categories. In the first category, reflection and diffraction events are separated in the post-stack or pre-stack data domain and then the diffraction events are used to image the corresponding diffractors or short wavelength discontinuities. In the second category, diffraction and reflection events are migrated simultaneously, then the diffraction and reflection images are separated in the image domain. The dip-angle domain is the one of most commonly used domains where the separation of diffractions and reflections can be performed. Most diffraction-imaging methods are based on ray theory. Ray-based methods are derived from solutions of the wave-equation approximated at high frequencies (e.g., short wavelengths with respect to scattering). Although these solutions are fast and efficient relative to non-approximated solutions at relatively low frequencies, they may fail to describe the physics of diffraction propagation and imaging in complex medium. In reality, diffractions are wave phenomena occurring when the dominated seismic wavelength is shorter or comparable to the scale of subsurface geological features or heterogeneities. Therefore, wave-equation-based methods can be used when ray theory fails.

The data processing system that is subsequently described is configured to perform wave-equation-based diffraction imaging. Reflection energy exists either in the negative-dip or positive-dip structure images, while the primarily focused diffraction image occurs in both dip structure images. The data processing system uses a two-way multiplication diffraction imaging condition. The positive-dip structure includes structures in which the reflector has positive values for tan(dx/dz) and negative-dip structure with negative values of tan(dx/dz). Using this methodology, the data processing system avoids the high computational cost associated with the calculation and disk storage of five-dimensional (5D) dip angle gathers which are needed to separate reflections from diffractions.

Two approaches for generating a seismic image using diffractions include pre-stack approaches and post-stack approaches. Post-stack migrations of the seismic data can be less computationally intensive than pre-stack migrations. To perform seismic imaging in the post-stack data domain, a data processing system can use a frequency-wavenumber (F-K) filtering approach. More specifically, instead of using separated wavefields to generate negative-dip and positive-dip structure images using pre-stack gathers the data processing system that is use stacked images to calculate negative-dip and positive-dip structures. A straightforward way is to use the F-K filter to filter out negative-dip and positive-dip structure images from the stacked images. Generally, the stacked images can be time or depth migrated images. After F-K dip filtering, the diffraction-based image is present in both negative-dip and positive-dip structure images. However, the reflection based image will exhibit a continuous event having negative or positive dips. These two opposite-dip images form the input of the multiplication imaging condition and are the equivalent to the negative-dip and positive-dip structure images generated during the corresponding pre-stack application, subsequently described.

FIG. 1 is a schematic view of a seismic survey being performed to map subterranean features such as facies and faults in a subterranean formation 100. The seismic survey provides the underlying basis for implementation of the systems and methods described with reference to FIGS. 4A-4B. The subterranean formation 100 includes a layer of impermeable cap rocks 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow along with clay material between the walls traps the petroleum. Other traps include salt domes and stratigraphic traps.

A seismic source 112 (for example, a seismic vibrator or an explosion) generates seismic waves 114 that propagate in the earth. The velocity of these seismic waves depends on several properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic waves 114 contact interfaces between geologic bodies or layers that have different velocities, the interfaces reflect some of the energy of the seismic wave and refracts some of the energy of the seismic wave. Such interfaces are sometimes referred to as horizons.

The seismic waves 114 are received by a sensor or sensors 116. Although illustrated as a single component in FIG. 1, the sensor or sensors 116 are typically a line or an array of sensors 116 that generate output signals in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, for example, a seismic two-way response time plot.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer system 124 may be displayed for user viewing using local or remote monitors or other display units. One approach to analyzing seismic data is to associate the data with portions of a seismic cube representing the subterranean formation 100. The seismic cube can also be display results of the analysis of the seismic data associated with the seismic survey.

Figure 2:
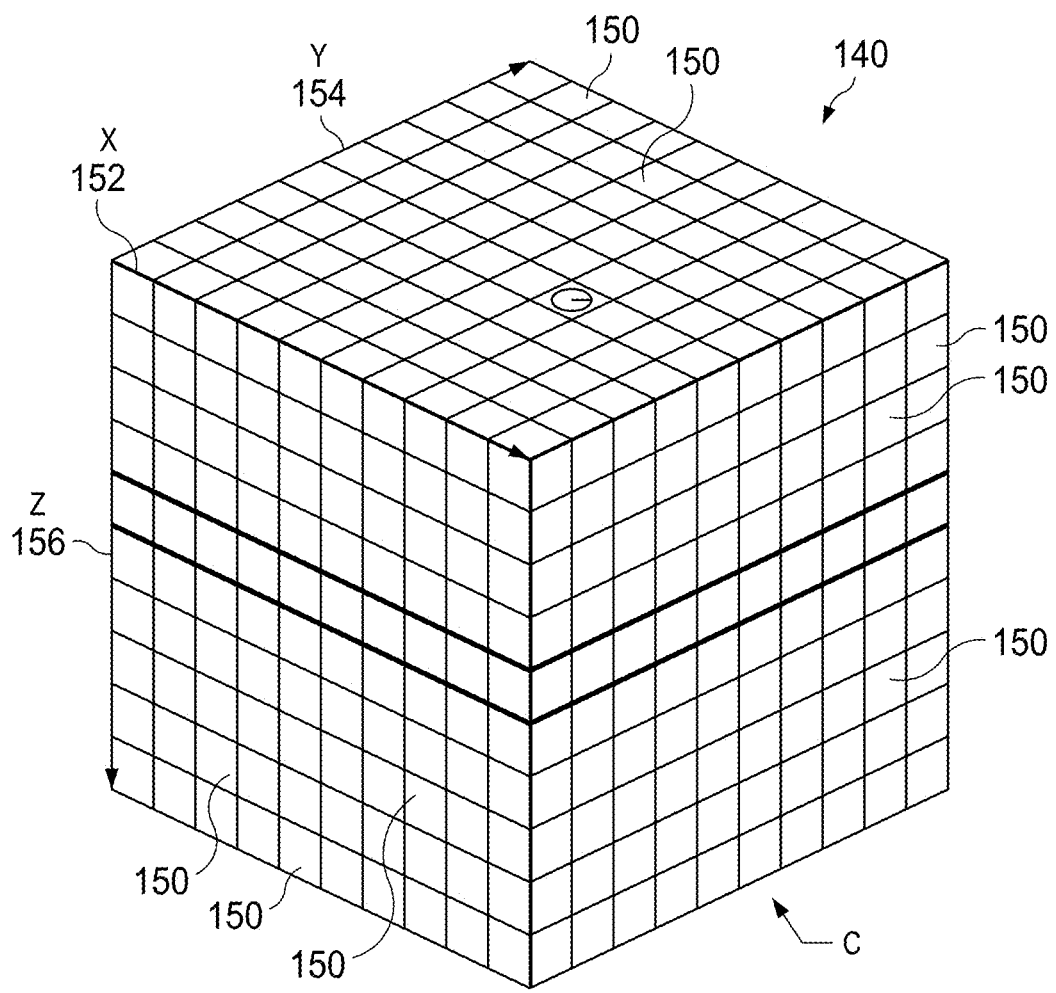
FIG. 2 illustrates a three-dimensional cube representing a subterranean formation.

FIG. 2 illustrates a seismic cube 140 representing at least a portion of the subterranean formation 100. The seismic cube 140 is composed of a number of voxels 150. A voxel is a volume element, and each voxel corresponds, for example, with a seismic sample along a seismic trace. The cubic volume C is composed along intersection axes of offset spacing times based on a delta-X offset spacing 152, a delta-Y offset spacing 154, and a delta-Z offset spacing 156. Within each voxel 150, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150.

Figure 3:
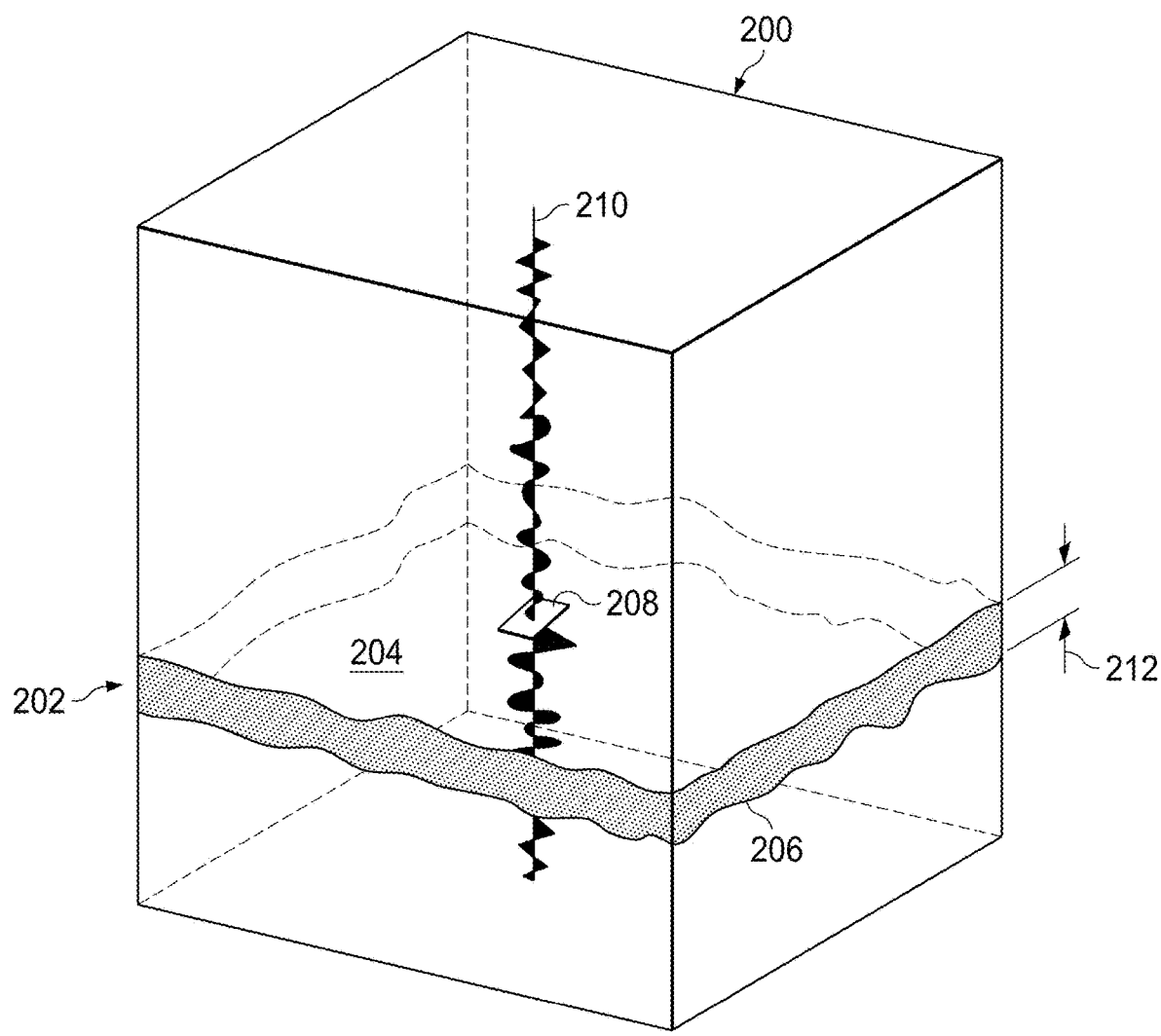
FIG. 3 illustrates a stratigraphic trace within the three-dimensional cube of FIG. 2.

FIG. 3 illustrates a seismic cube 200 representing a formation. The seismic cube has a stratum 202 based on a surface (for example, amplitude surface 204) and a stratigraphic horizon 206. The amplitude surface 204 and the stratigraphic horizon 206 are grids that include many cells such as exemplary cell 208. Each cell is a seismic trace representing an acoustic wave. Each seismic trace has an x-coordinate and a y-coordinate, and each data point of the trace corresponds to a certain seismic travel time or depth (t or z). For the stratigraphic horizon 206, a time value is determined and then assigned to the cells from the stratum 202. For the amplitude surface 204, the amplitude value of the seismic trace at the time of the corresponding horizon is assigned to the cell. This assignment process is repeated for all of the cells on this horizon to generate the amplitude surface 204 for the stratum 202. In some instances, the amplitude values of the seismic trace 210 within window 212 by horizon 206 are combined to generate a compound amplitude value for stratum 202. In these instances, the compound amplitude value can be the arithmetic mean of the positive amplitudes within the duration of the window, multiplied by the number of seismic samples in the window.

Figure 4A:
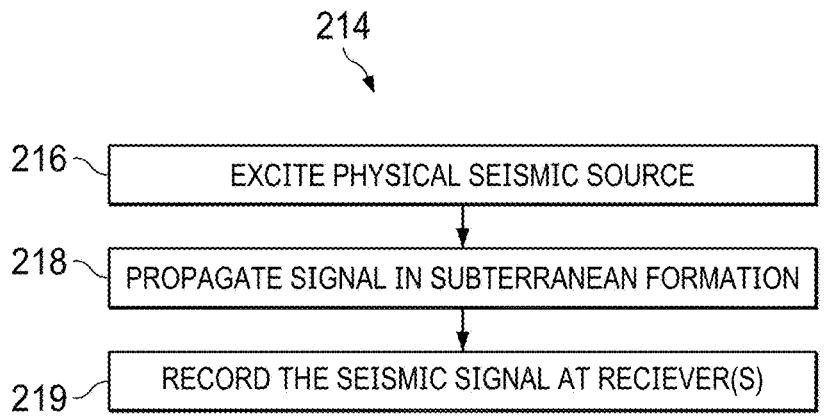
FIGS. 4A-4C illustrate flow diagrams including example processes for identifying geologic features in a subterranean formation using seismic diffraction imaging.
Figure 4B:
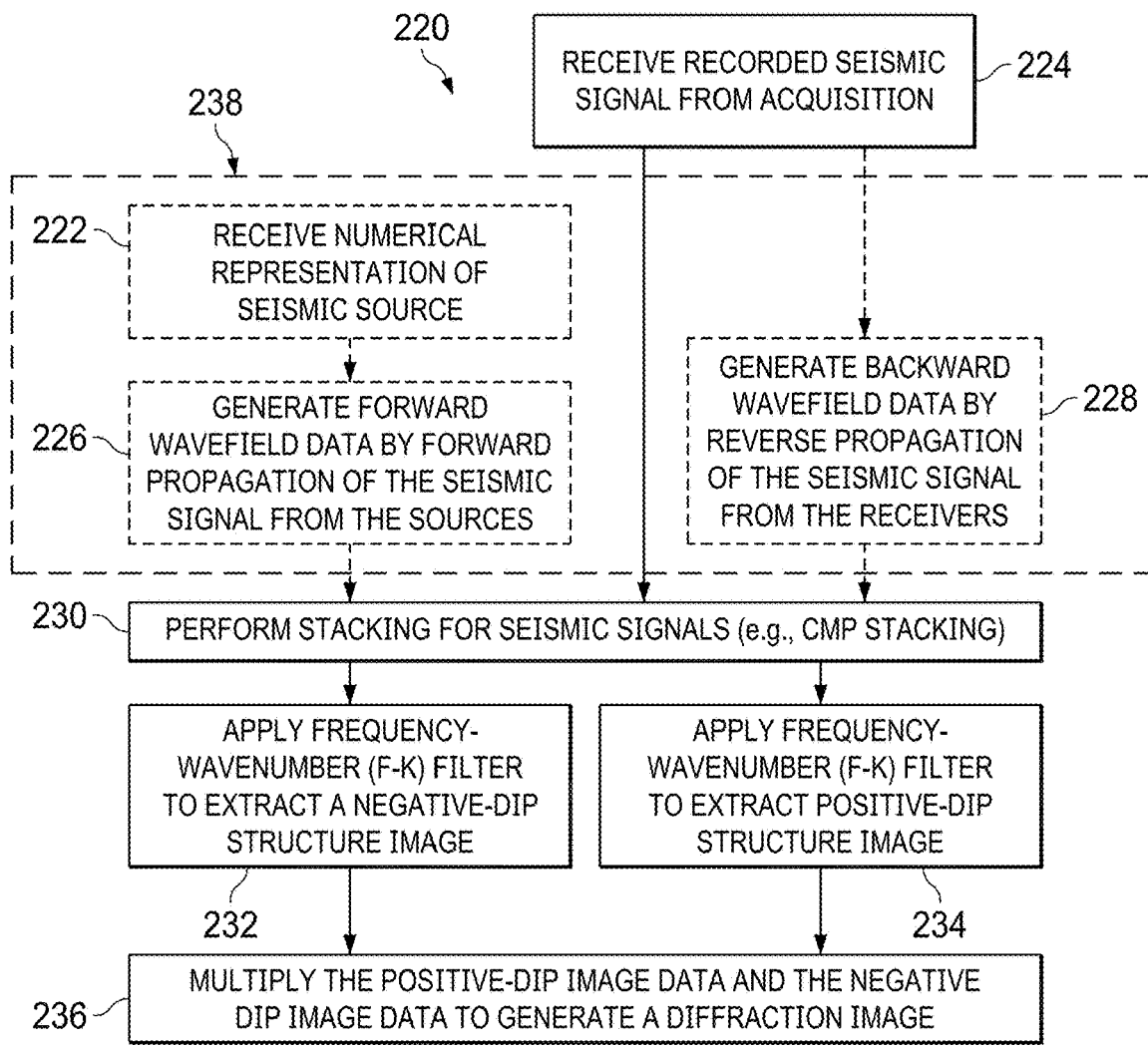
Figure 4C:
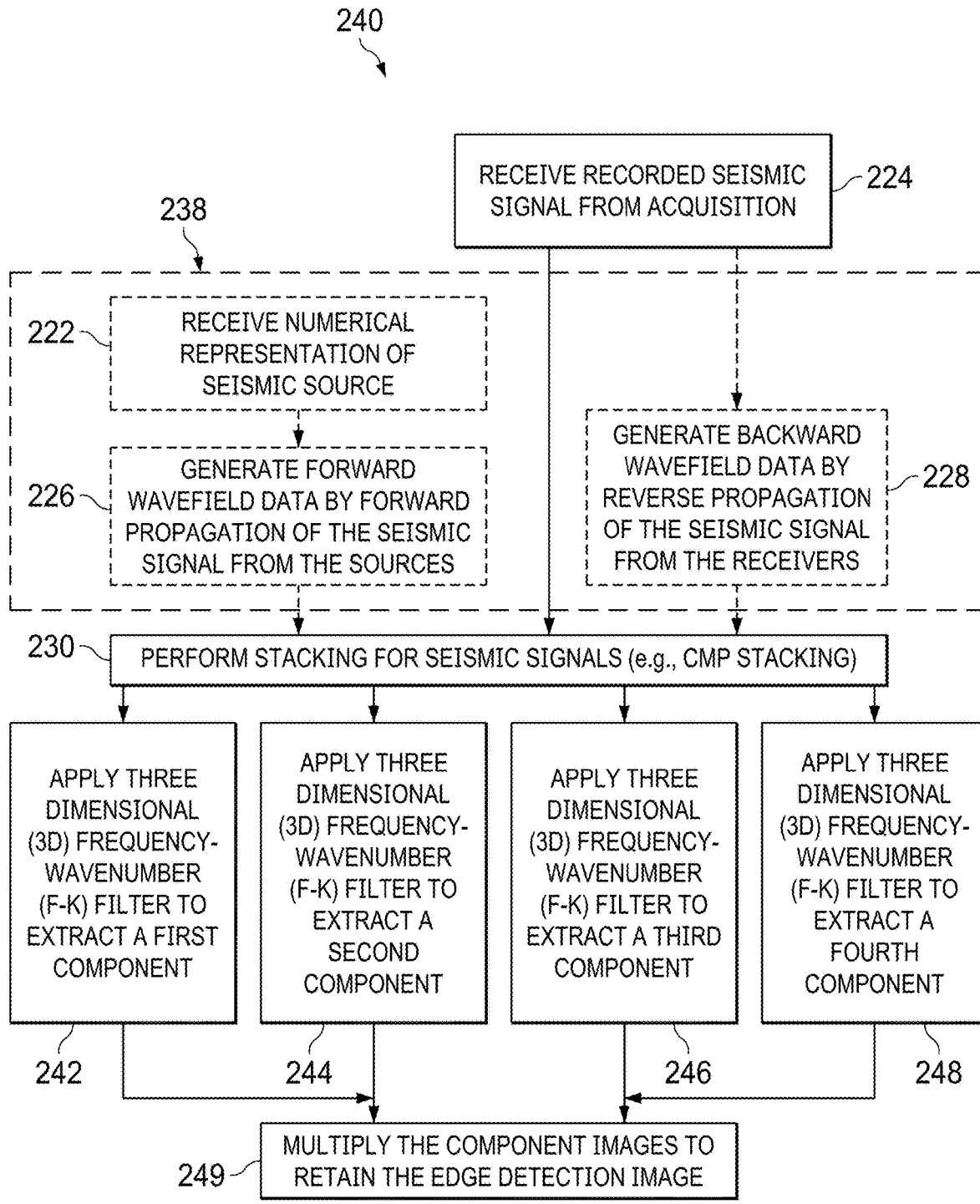
Figure 5:
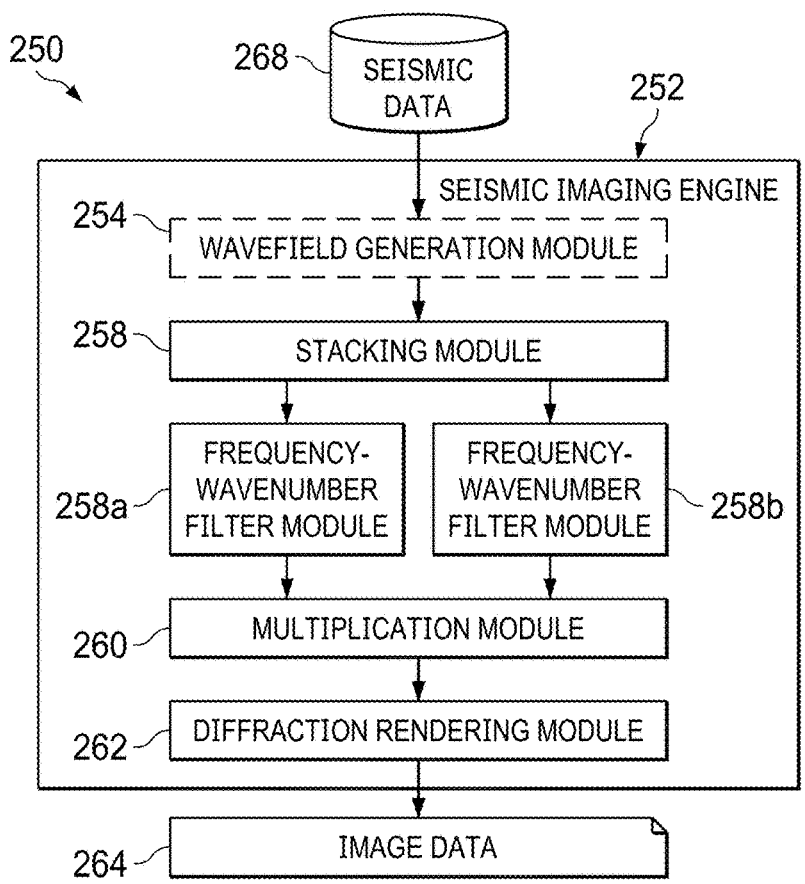
FIG. 5 is a block diagram of an example system for identifying geologic features in a subterranean formation using seismic diffraction imaging.

FIGS. 4A-4C illustrate flow diagrams including example processes 214, 220, and 240 respectively, for identifying geologic features in a subterranean formation using seismic diffraction imaging. FIG. 5 shows a data processing system 250 for identifying geologic features in a subterranean formation using seismic diffraction imaging with post-stack edge detection. The data processing system 250 of FIG. 5 is configured to execute the processes 214 and 220 of FIGS. 4A-4C.

Turning to FIG. 4A, a process 214 performed by a physical acquisition system (such as a part of system described in relation to FIG. 1) is shown. One or more sources (such as source 112 of FIG. 1) are excited (216) to generate a seismic signal in the formation 100. The seismic signal is propagated (218) through subterranean formation 100 and recorded (219) at receiver(s) (such as source 116 of FIG. 1).

The recorded signal at the receiver and a numerical representation of the generated signal at the source can be used by the seismic imaging engine 252 of FIG. 5 for generating the diffraction image from a seismic model, as shown in processes 220 and 240 of FIGS. 4B-4C. In an aspect, seismic imaging engine 252 is configured to receive the seismic data 268 and generate structure image data 264 of the subterranean formation using a series of modules. The modules can include a wavefield generation module 254, a stacking module 256, F-K filter modules 258a-b, a multiplication module 260, and a diffraction rendering module 262. In some implementations, the wavefield generation module 254 is not needed to obtain a stacked seismic image. Rather, the stacked seismic image can be obtained using any known process.

Describing the process 220 of FIG. 4B with the system 252 of FIG. 5, in some implementations, the wavefield generation module 254 (or an interface of the system 252) is configured to obtain seismic data 268 that is generated by one or more sources and received by one or more receivers. In an example for which a wave equation based processed is used, the wavefield generation module 254 receives (222) the representation of the seismic signal in a subterranean formation. The wavefield generation module 254 receives (224) the seismic data 268 recorded by the receivers. The waveform generation module 254 generates (226) from the seismic data 268 forward wavefield data by forward propagation of the seismic signal from the sources. In other words, the waveform generation module 254 is configured to generate a source wavefield from source representing a subterranean formation. The waveform generation module 254 is configured to generate (228) backward wavefield data by reverse propagation of the seismic signal from the receivers. In other words the wavefield generation module 254 is configured to generate a receiver wavefield from the seismic data representing the subterranean formation. As previously stated, other processes than the wave equation-based method to generate stacked seismic image can be performed to the seismic data. A wave equation-based method is shown as illustrative, but optional as designated by dashed border 238. There are many other different ways to get stacked seismic image, and any of these processes can be used. In such a case, the seismic signal recorded at step (224) can be received for stacking at step (230).

The data processing system 250 is configured to execute the F-K filter modules 258a-b to apply a two-dimensional (2D) F-K dip filter to post-stack seismic data. To do this, the stacking module 256 performs (230) a stacking operation, such a common-midpoint stacking. However, any stacking approach can be used. The F-K filter module 258a applies (232) the F-K filter to filter out the negative-dip structure image. In the F-K domain, the negative dip structure image includes values where values in the z-domain and the x-domain are both positive (kz>0, kx>0), and where both the values in in the z-domain and the x-domain are both negative (kz<0, kx<0).

The F-K filter module 258b is configured to apply (234) a 2D F-K dip filter to the post-stack image to filter out a positive-dip structure image. In the F-K domain, the positive dip includes values where values in the z-domain is positive and the x-domain is negative (kz>0, kx<0), and where the values in in the z-domain and are negative and the values in the x-domain are positive (kz<0, kx>0). The result is that the negative dip image and the positive dip imaging conditions have each been extracted from the seismic data.

The diffraction rendering module is configured to multiply (236) the positive-dip imaging condition with the negative-dip imaging condition to generate a diffraction-enhanced seismic image 264. In this way, the data processing system 250 is configured to enhance the structural and geologic edges and suppress the reflection based images. This process is further described in relation to FIGS. 6-16C.

Turning to FIG. 4C, the data processing system 250 is configured to execute process 240 in which the post-stack edge detection application is extended to accommodate three dimensional (3D) applications. Instead of negative-dip and positive-dip structure images, the data processing system obtains four components of structure images with different dips and azimuths. The process (240) of edge detection using the multiplication imaging condition for the 3D post-stack application is as follows.

The data processing system 250 generates the seismic stack as described previously for process 220. Specifically, the data processing system 250 is configured to obtain seismic data 268 that is generated by one or more sources and received by one or more receivers. In an example, the wavefield generation module 254 receives (222) the representation of the seismic signal in a subterranean formation. The wavefield generation module 254 receives (224) the seismic data 268 recorded by the receivers. The waveform generation module 254 generates (226) from the seismic data 268 forward wavefield data by forward propagation of the seismic signal from the sources. In other words, the waveform generation module 254 is configured to generate a source wavefield from source representing a subterranean formation. The waveform generation module 254 is configured to generate (228) backward wavefield data by reverse propagation of the seismic signal from the receivers. In other words, the wavefield generation module 254 is configured to generate a receiver wavefield from the seismic data representing the subterranean formation. The stacking module 256 performs (230) a stacking operation, such a common-midpoint stacking. However, any stacking approach can be used. Again, as previously stated, other processes than the wave equation-based method to generate stacked seismic image can be performed to the seismic data. A wave equation-based method is shown as illustrative, but optional as designated by dashed border 238. There are many other different ways to get stacked seismic image, and any of these processes can be used. In such a case, the seismic signal recorded at step (224) can be received for stacking at step (230).

The F-K filter modules 258a-b apply 3D filters to the post-stack seismic data. The F-K filter modules 285a-b are configured to apply (242) a 3D F-K dip filter to generate a first component of the dip structure image. The first component represents portions of the seismic data in which values of each of the x-domain, the y-domain, and the z-domain are positive in the F-K domain (kz>0, ky>0, kx>0). This first component also represents portions of the seismic data for which values of each the x-domain, the y-domain, and the z-domain are negative in the F-K domain (kz<0, ky<0, kx<0) in the F-K domain.

Similarly, the F-K filter modules 258a-b are configured to apply (244) the 3D F-K filter to extract a second component of the dip structure image. The second component of dip structure image represents the portions of the seismic data in which values of each of the x-domain and the y-domain are positive while values of the z-domain are negative in the F-K domain (kz>0, ky>0, kx<0). This second component also represents portions of the seismic data for which values of each the z-domain and the y-domain are negative while values of the x-domain are positive in the F-K domain (kz<0, ky<0, kx>0).

Continuing with process 240, the F-K filter modules 258a-b are configured to apply (246) the 3D F-K filter to extract a third component of the dip structure image. The third component of dip structure image represents the portions of the seismic data in which values of each of the x-domain and the z-domain are positive while values of the y-domain are negative in the F-K domain (kz>0, ky<0, kx>0). This third component also represents portions of the seismic data for which values of each the z-domain and the x-domain are negative while values of the y-domain are positive in the F-K domain (kz<0, ky>0, kx<0).

Continuing with process 240, the F-K filter modules 258a-b are configured to apply (248) the 3D F-K filter to extract a fourth and final component of the dip structure image. The fourth component of dip structure image represents the portions of the seismic data in which values of each of the x-domain and the y-domain are negative while values of the z-domain are positive in the F-K domain (kz>0, ky<0, kx<0). This fourth component also represents portions of the seismic data for which values of each the x-domain and the y-domain are positive while values of the z-domain are positive in the F-K domain (kz<0, ky>0, kx>0).

The multiplication module 260 is configured to multiply (249) the four component images, each with different dip and azimuth values, to retain an edge detection image and eliminate the reflection image. Generally, splitting the 3D data volume into 2D slices then applying the 2D diffraction imaging of process 220 is an alternative strategy for the process 240. For example, any two dimensions of x, y and z can be chosen to split the data volume. This results in three edge detection cubes. The data processing system 250 is configured for summation of these edge detection images for generating the final edge detection image.

For each of the processes 220, 240, the data processing system is configured to generate image data 264 using the diffraction rendering module 262. The image data 264 can be used to present the seismic image data produced by each of the processes 220, 240 on a user interface or to provide a representation of the image data 264 for a downstream application.

Figure 6:
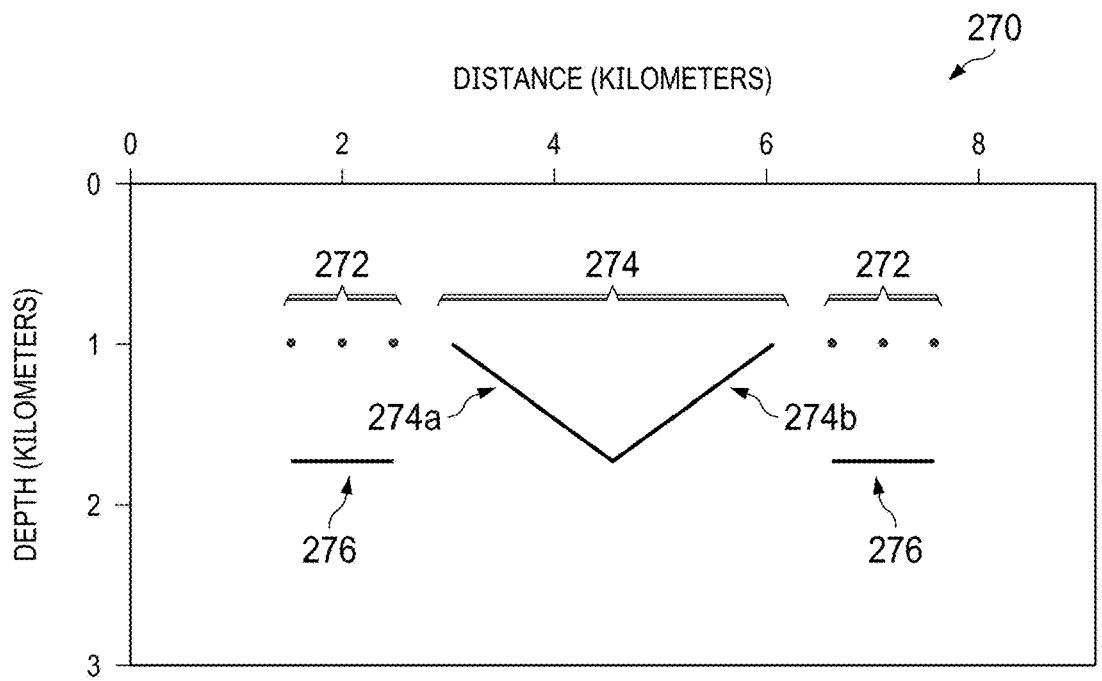
FIG. 6 shows an example structure for illustrating an example reflectivity model.

FIG. 6 shows in graph 270 an example structure illustrating an example reflectivity model. The seismic imaging engine 252 of the data processing system 250 is configured to execute multiplication imaging condition for post-stack diffraction imaging. The seismic imaging engine 252 utilizes a feature of the imaging in which a generated diffraction image exists in both positive-dip and negative-dip structure images after migration, but a generated reflection image only exists in either a positive-dip or negative-dip structure image. The multiplication module 260 applies the sample-by-sample multiplication imaging condition to the opposite dip images, and the diffraction energy is retained and the reflection energy is significantly attenuated. The graph 270 shows a simple reflectivity model with six scatterers 272, two flat layers 276 and a V-type structure 274 including a positive-dip portion 274b and a negative-dip portion 274a. Using this model, the modeled seismic data contain both reflected events generated from the reflectors and diffraction events from individual scatterers 272 and reflector edges 276.

Figure 7:
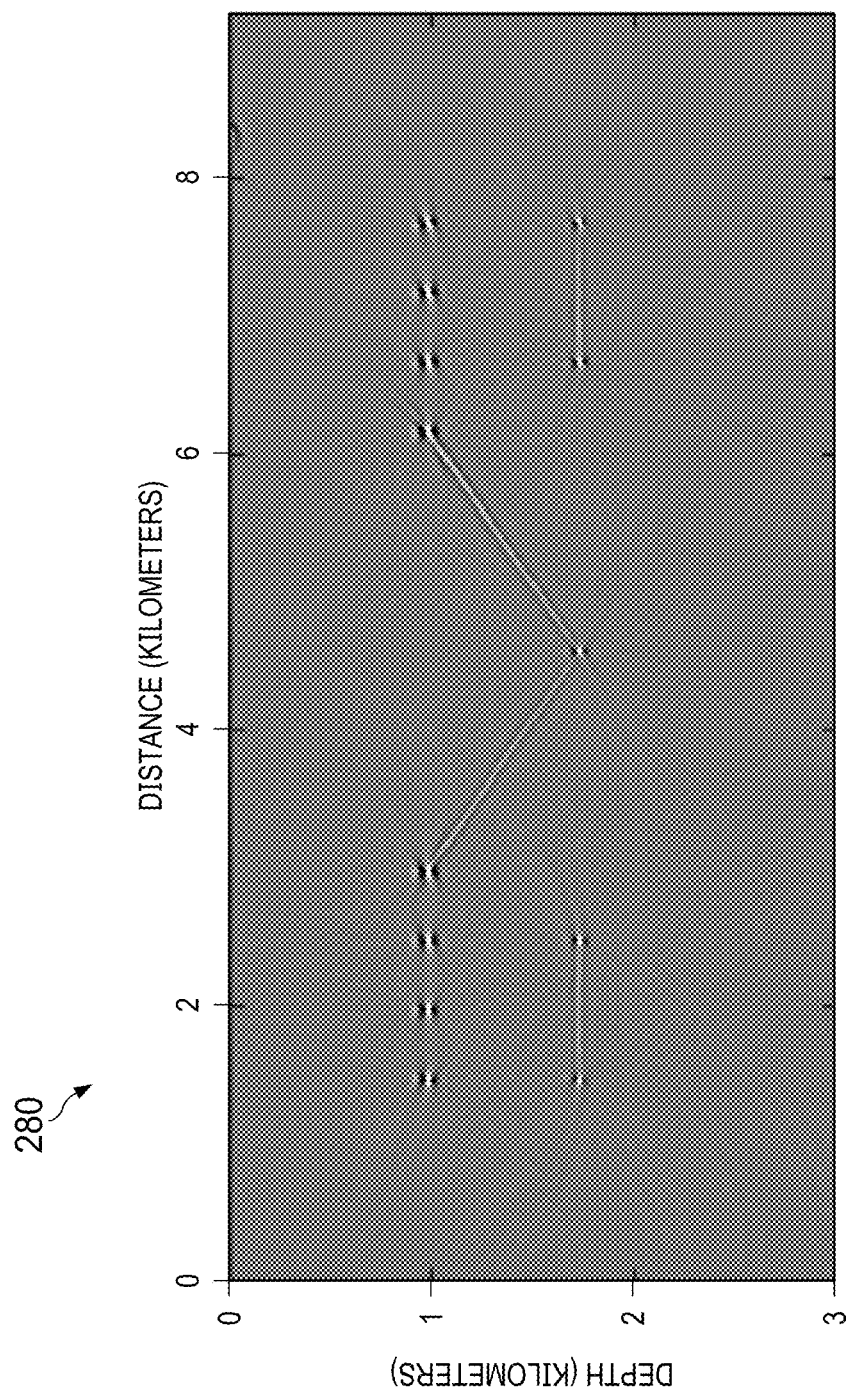
FIG. 7 illustrates a multiplication diffraction imaging condition using an image of the example structure of FIG. 6.

FIG. 7 illustrates a multiplication diffraction imaging condition using the example structure 270 of FIG. 6. In this example using synthetic data, the data processing system 250 uses a simple structure that is composed of the six diffractors 272, one V-shaped structure 274 and two flat layers 276. Here, the horizontal and depth interval of the model is 5 meters (m). The acquisition geometry is comprised of 450 single-sided shot gathers that are generated with shot and receiver intervals of 20 m, and a maximum offset of 4 km. The reverse time migration (RTM) image 280 includes each of the reflection and diffraction images. In order to apply the multiplication image condition to generate the corresponding edge detection image, the data processing system 250 uses the 2D F-K dip filter to filter out the negative-dip and positive-dip structures as previously described. Thus, the seismic imaging engine 252 uses this process for a practical and efficient way to obtain an edge detection image.

Figure 8A:
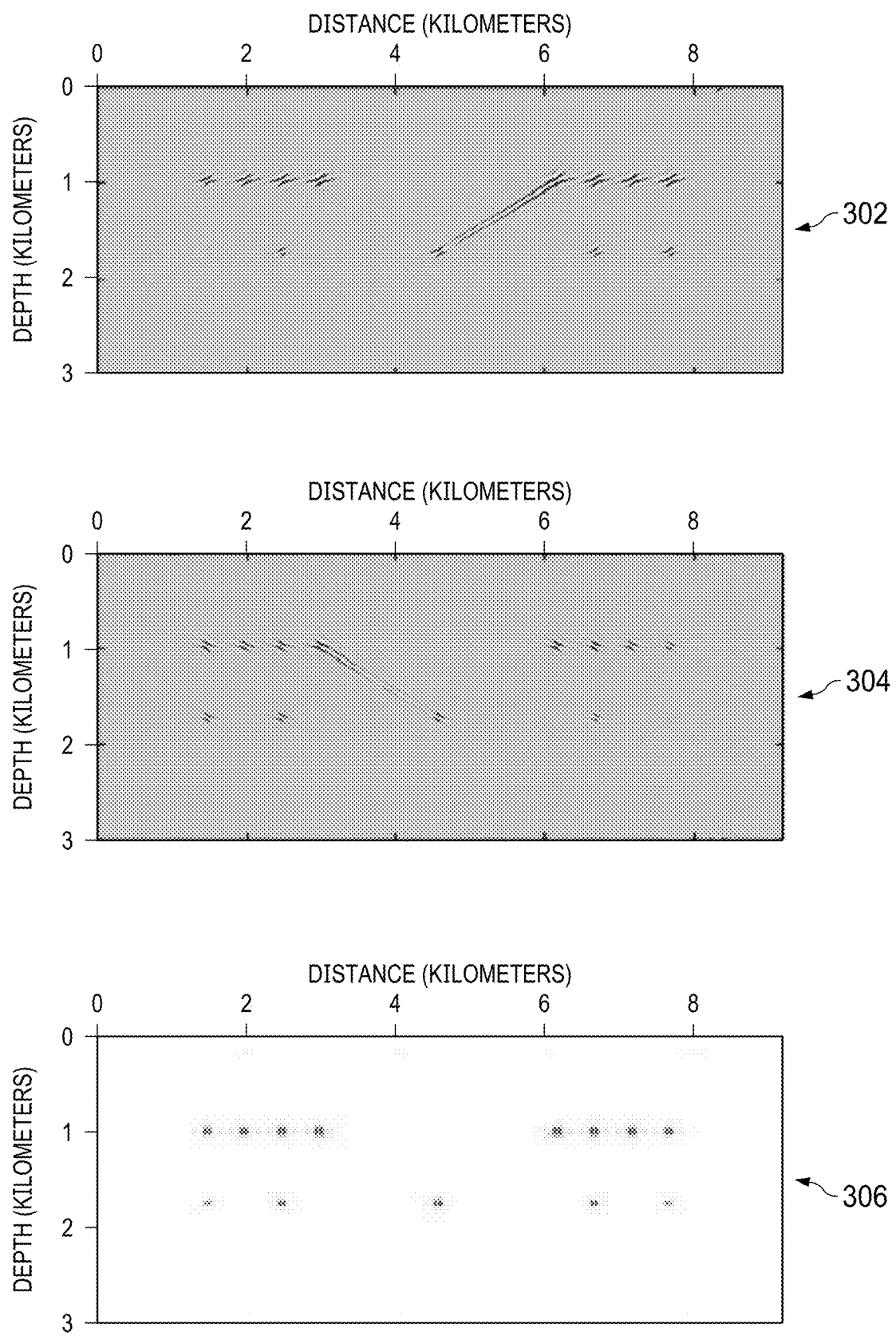
FIG. 8A shows reflectors and diffractors from the data of FIG. 7

Turning to FIG. 8A, images 302, 304, and 306 show the reflectors and diffractors from the data of FIG. 7. For example, image 302 shows a filtered negative-dip structure, which only has the negative-dip reflector and diffractors. Image 304 shows a filtered positive-dip structure, which has the positive-dip reflector and diffractors. Because each diffractor represents dip angles ranging from −90 degrees to 90 degrees, the diffractor shows in both the negative-dip structure image 302 and the positive-dip structure image 304 after F-K filtering. Both the negative-dip structure image 302 and the positive-dip structure image 304 have no flat reflection image because a taper is applied near kx=0, which represents the zero dip in the F-K domain. In contrast, without tapering both negative-dip and positive-dip structure images, the existing flat reflection image will cause a flat event leakage after using the multiplication imaging condition. Similarly, a taper at the kz=0 is applied to avoid vertical event leakage. By applying sample-by-sample multiplication of the negative-dip structure image 302 and the positive-dip structure image 304, the data processing system 250 generates edge detection and the respective isolated diffractor image 306. Image 306 clearly shows that the multiplication imaging condition can suppress the reflection based image and enhance the diffraction image.

Figure 8B:
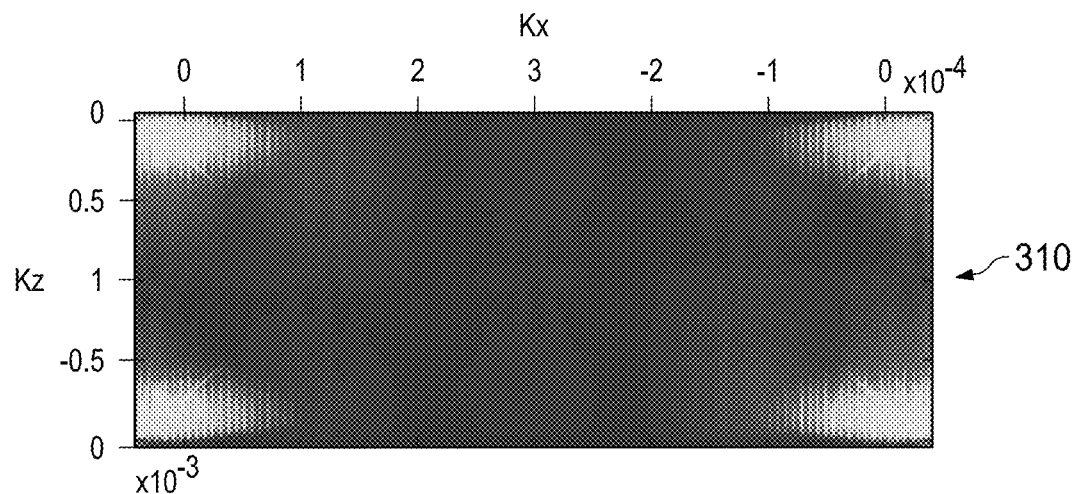
FIG. 8B shows spectra of the structure images of FIG. 8A.
Figure 8B:
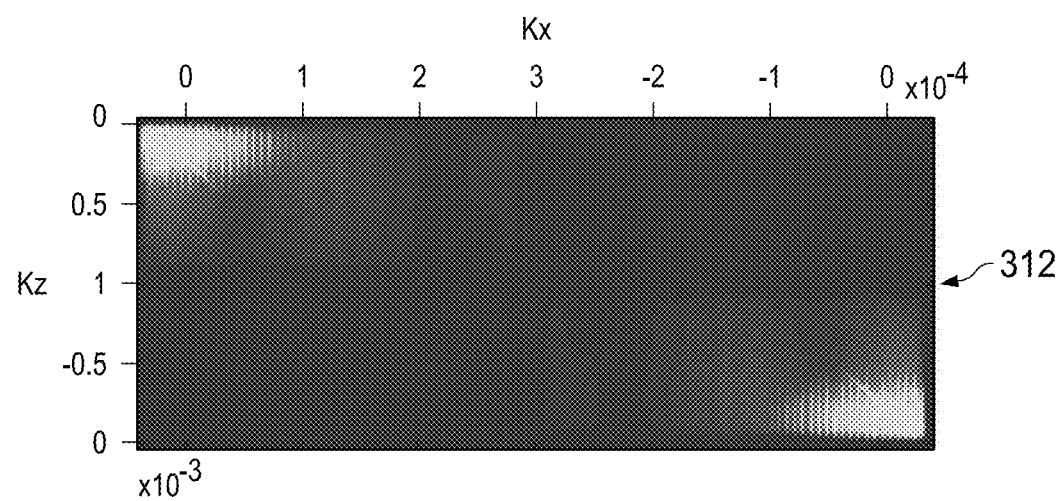
Figure 8B:
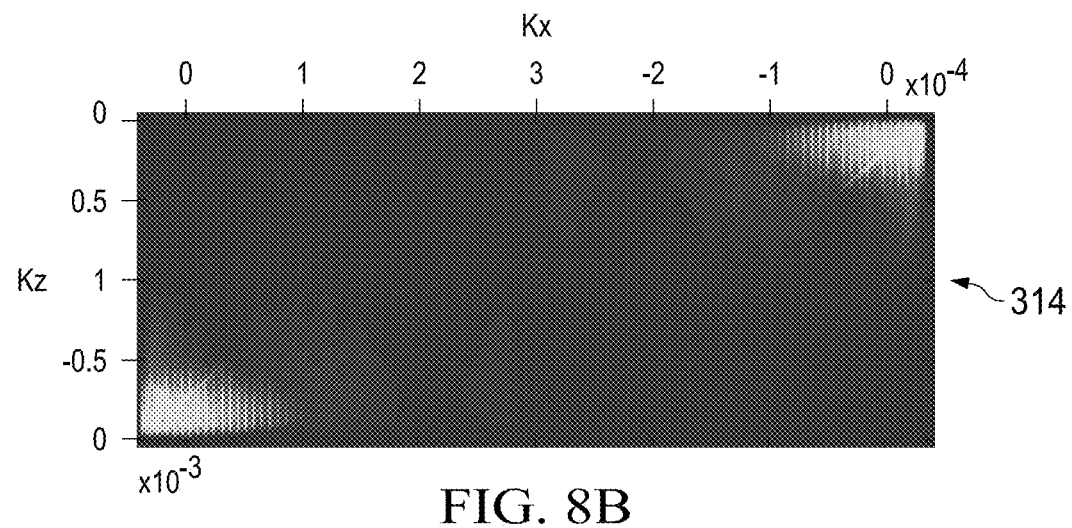

Turning to FIG. 8B, spectra of the structure images of FIG. 8A are shown. Image 310 shows a spectra of the total RTM image 306. Image 312 shows a spectra of the negative-dip image 302. Image 314 shows a spectra of the positive-dip structure image 304. The images 310, 312, and 314 show amplitudes of spectra in the F-K domain. This illustrates that different sections in F-K domain represent different dips in the space domain. For example, the section (kz>0, kx>0) and (kz<0, kx<0) represents negative dip in space domain.

Figure 9:
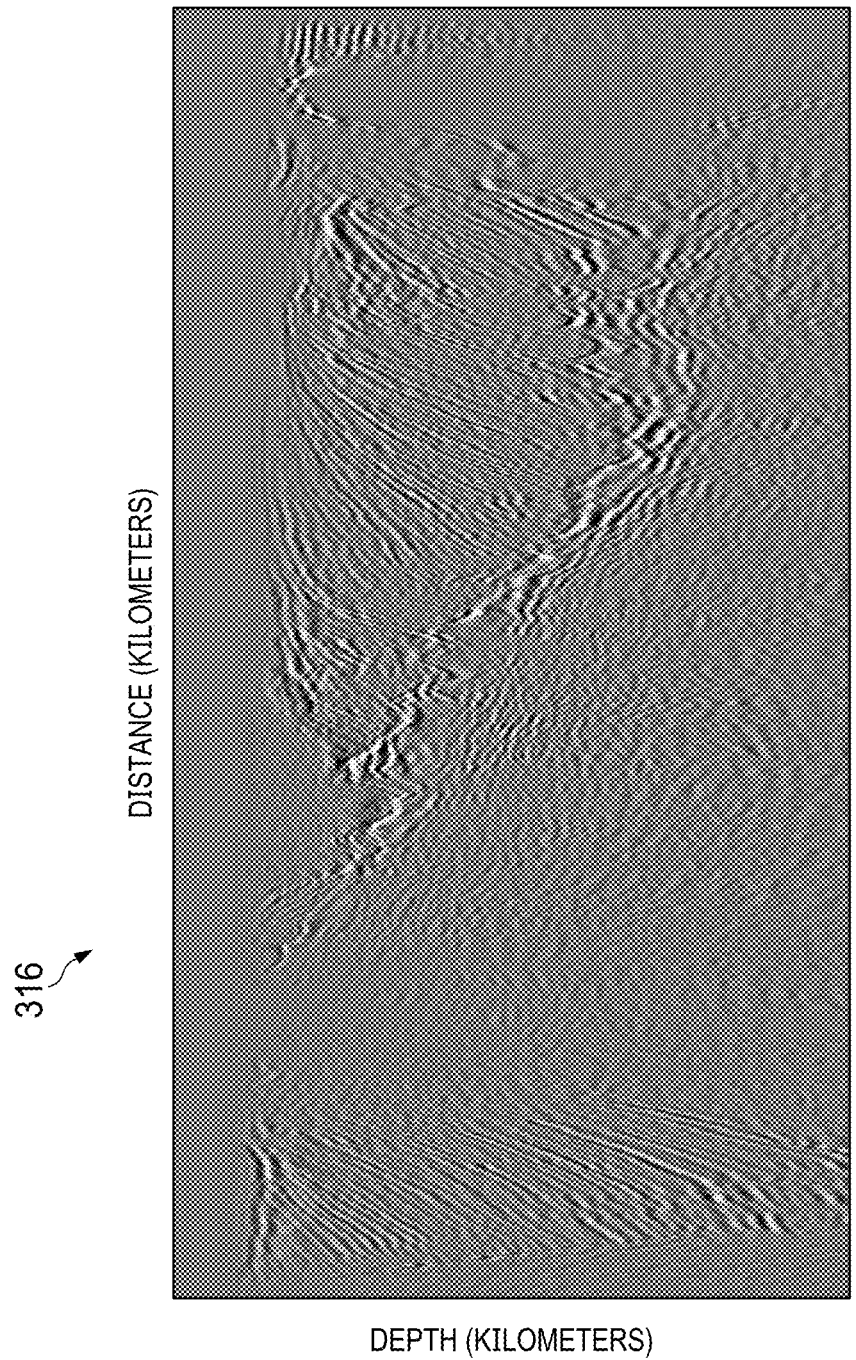
FIG. 9 shows an illustration of a depth migrated image.

Turning to FIG. 9, an illustration of a depth migrated image 316 is shown. The image 316 represents a real data set (rather than synthetic data), and is generated by phase-shift plus interpolation (PSPI) depth migration of the data set. This data set is comprised of 1000 single-sided shot gathers with shot interval and receiver intervals of 20 m and a maximum offset of 4 kilometers (km). The peak frequency of the data is 30 Hertz (Hz). Image 316 shows the one-way wave-equation based migration image which includes reflectors, faults and other geological discontinuities. To generate the edge detection image, the data processing system 250 filters out the negative-dip and positive-dip structure images from the PSPI result.

Figure 10A:
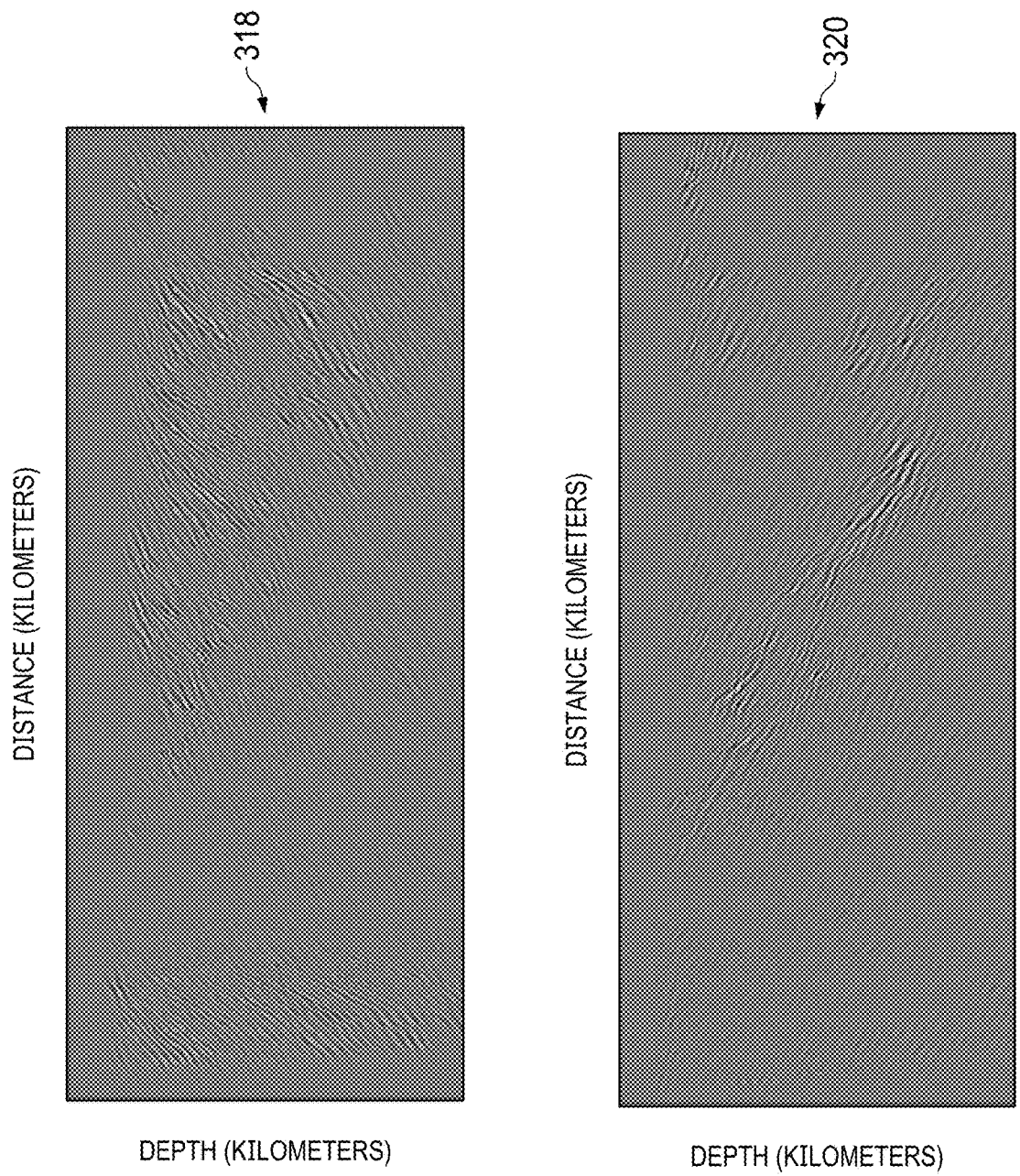
FIG. 10A shows the F-K filtered negative-dip structure image and positive-dip structure image generated from the PSPI result of FIG. 9.
Figure 10B:
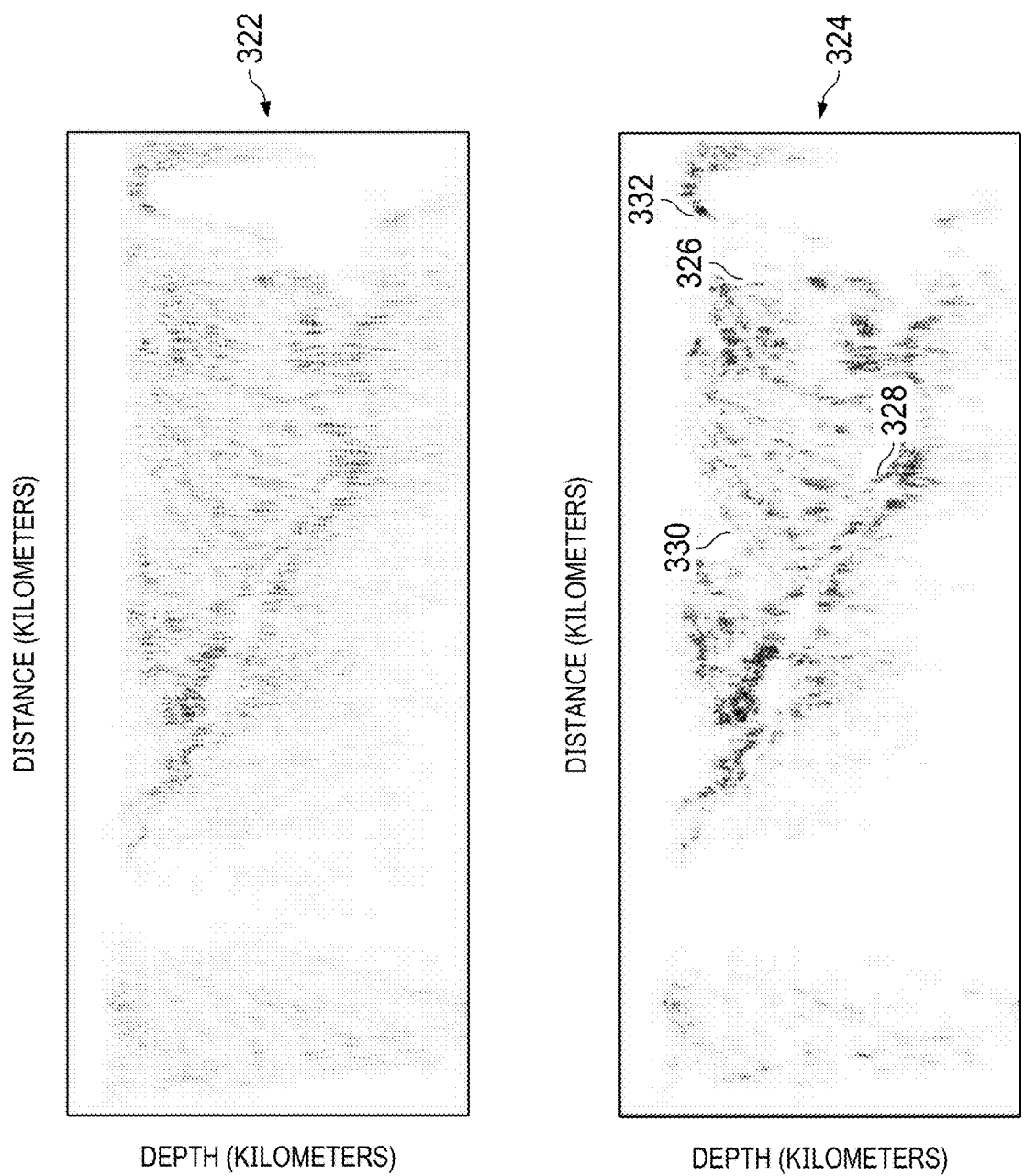
FIG. 10B shows an edge detection image after applying the sample-by-sample multiplication imaging condition between the negative-dip structure image and positive-dip structure image of FIG. 10A.

FIG. 10A shows the F-K filtered negative-dip structure image 318 and positive-dip structure image 320 generated from the PSPI result of FIG. 9. Images 318 and 320 are generated using the processes described above in relation to FIGS. 4A-4C. Turning to FIG. 10B, image 322 shows the edge detection image after applying the sample-by-sample multiplication imaging condition between the negative-dip structure image 318 and positive-dip structure image 320 of FIG. 10A. In some implementations, to further enhance the edge detection result of image 322, the data processing system 250 can be configured to apply an amplitude squared operation on the image 322 to produce image 324. Image 324 shows more clearly the faults as indicated by arrow 326, the discontinuous image points indicated by arrow 328, and the unsmoothed salt boundary represented by arrow 332. These faults, image points, and boundaries are properly imaged as opposed to all reflection data, which are completely suppressed. However, there can be some weak leakage as denoted by the arrow 330, which is caused by the variability of reflection amplitudes along reflectors.

Figure 11A:
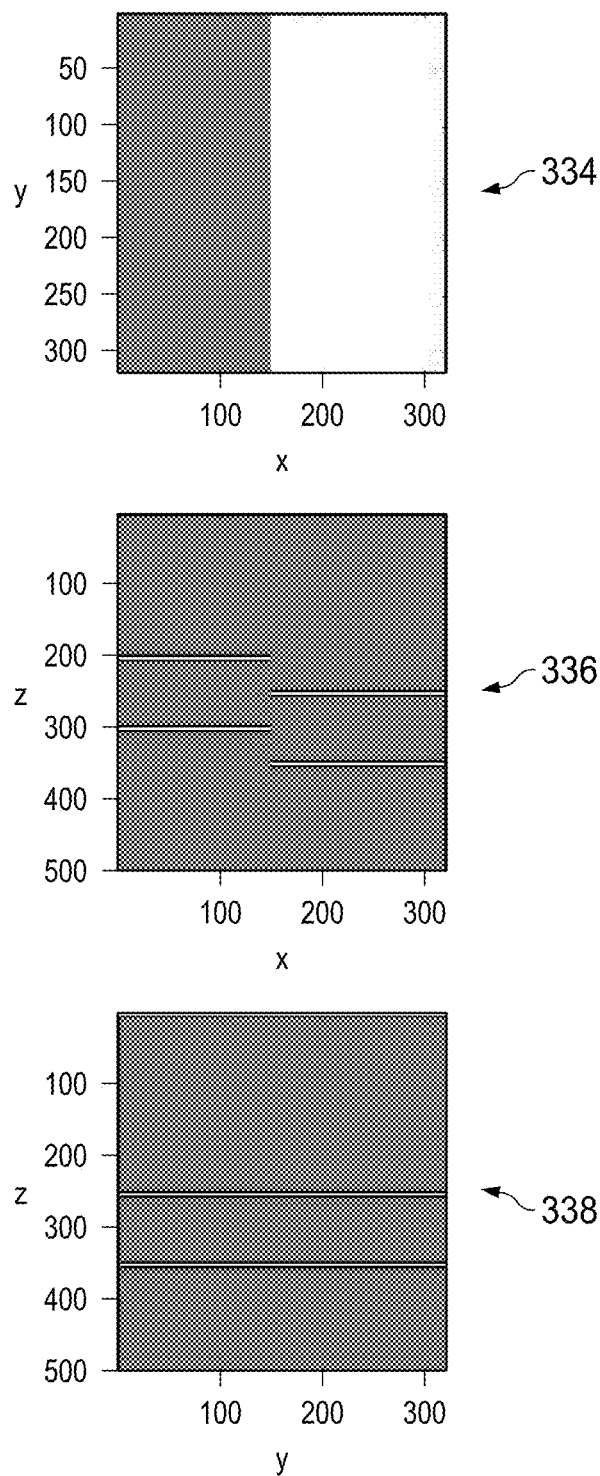
FIGS. 11A-11E show slices of a migration image and four components in the wavenumber domain for sample data.
Figure 11B:
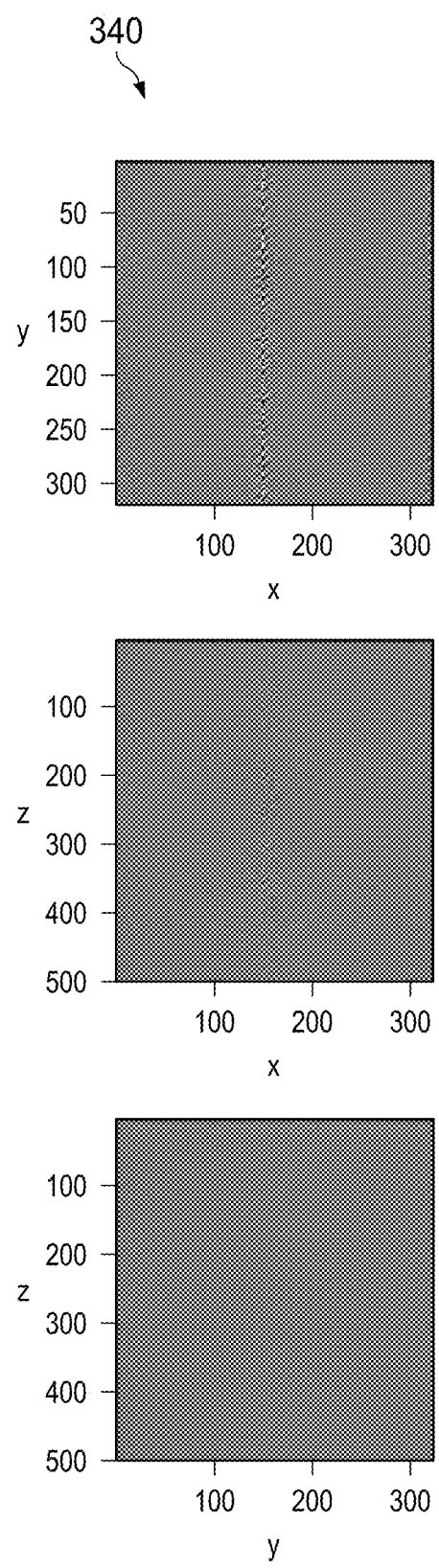
Figure 11C:
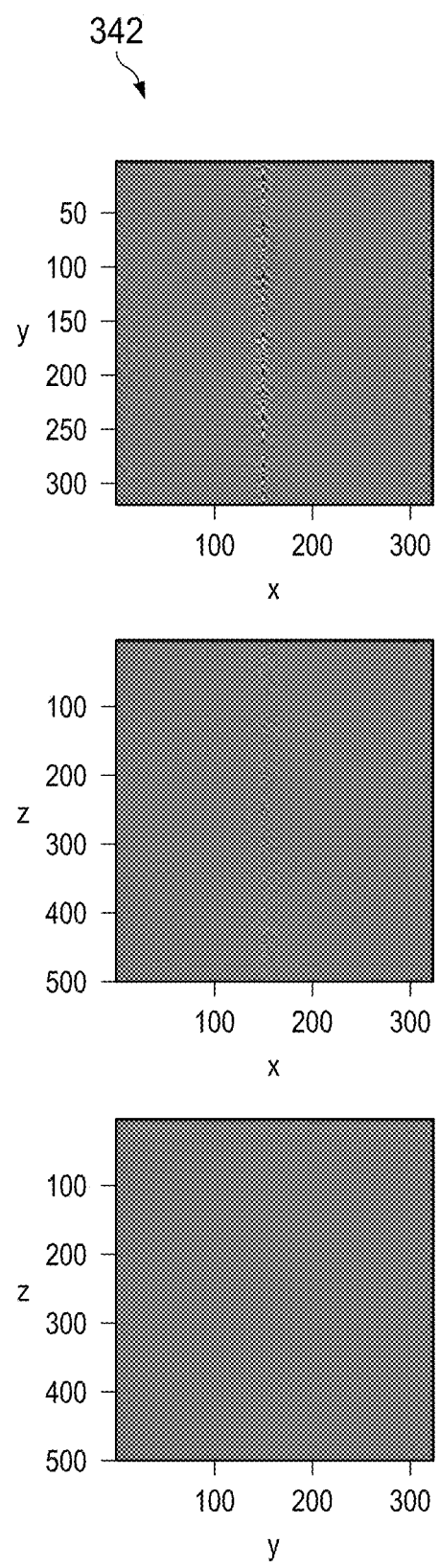
Figure 11D:
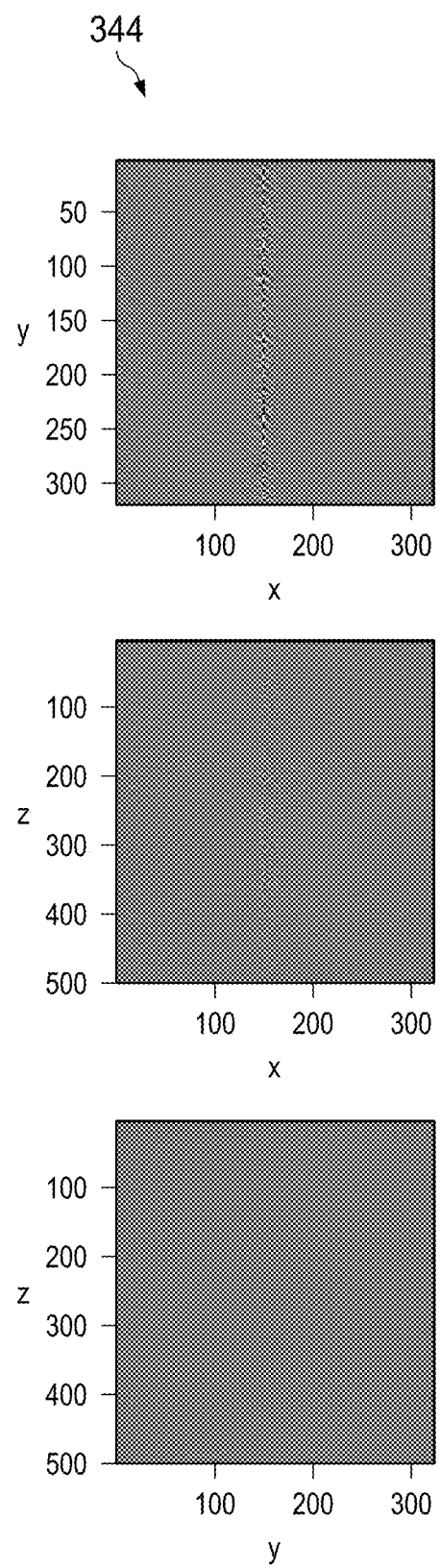
Figure 11E:
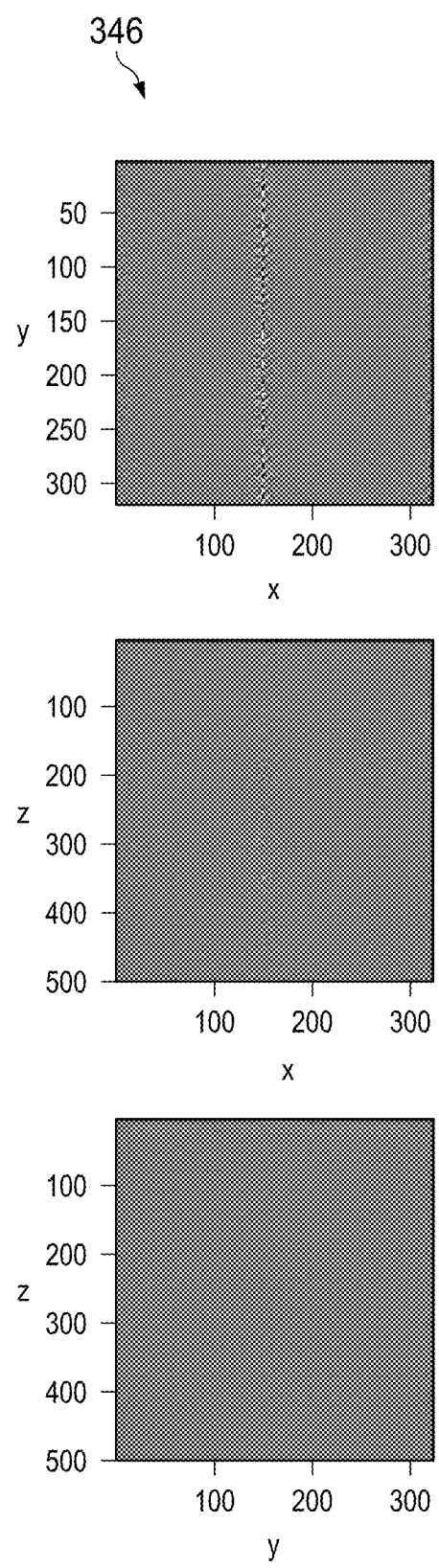

Turning to FIGS. 11A-11E, illustrations are shown for testing the validity and applicability of this methodology for 3D data sets. A model has two flat layers with a vertical fault at the 150th point along the x direction. The model size is 501*321*321 grid points, corresponding to vertical sampling nz, and two horizontal samplings nx and ny. FIG. 11A shows three slices 334, 336, and 338 of the migration image at the grid points located at x=250, y=251 and z=350, respectively. A vertical fault is shown in the second slice 336, with the two flat layers having a vertical shift of 50 points. FIGS. 11B-11E illustrate the four components in the wavenumber domain. FIG. 11B shows slices of the component 340 where kz>0, ky>0, kx>0 and kz<0, ky<0, kx<0. FIG. 11C shows slices of the component 342 where kz>0, ky>0, kx<0 and kz<0, ky<0, kx>0. FIG. 11D shows slices of the component 344 where kz>0, ky<0, kx>0 and kz<0, ky>0, kx<0. FIG. 11E shows slices of the component 346 where kz>0, ky<0, kx<0 and kz<0, ky>0, kx>0.

As previously described, for the 3D case, two strategies can be applied by the data processing system 250. The first strategy is to apply a 3D dip filter to generate four components with different dips and azimuths.

Figure 12:
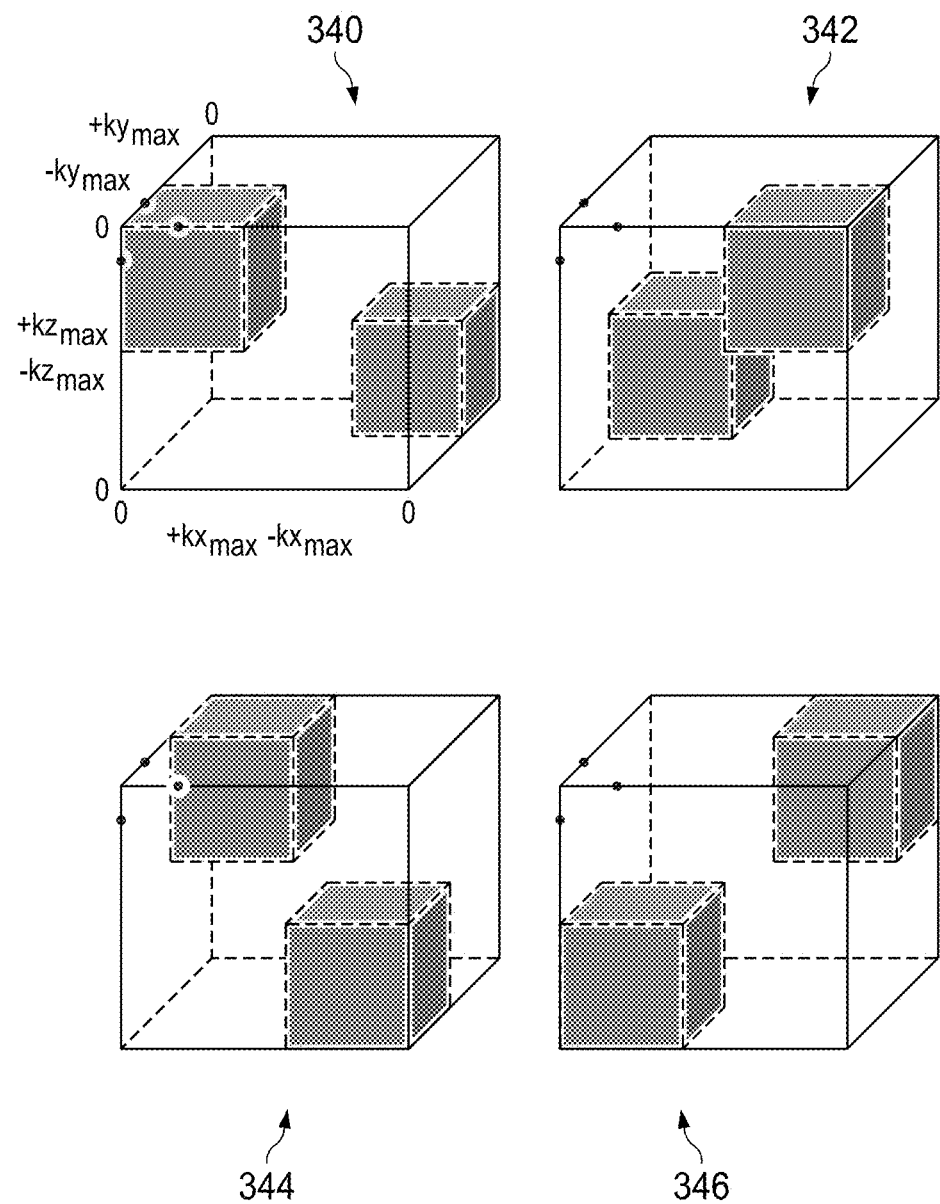
FIG. 12 illustrates the four components in the wavenumber domain.

FIG. 12 illustrates the four components 340, 342, 344, 346 in the wavenumber domain. As stated previously, component 340 is where kz>0, ky>0, kx>0 and kz<0, ky<0, kx<0. Component 342 is where kz>0, ky>0, kx<0 and kz<0, ky<0, kx>0. Component 344 is where kz>0, ky<0, kx>0 and kz<0, ky>0, kx<0. Component 346 is where kz>0, ky<0, kx<0 and kz<0, ky>0, kx>0.

Figure 13:
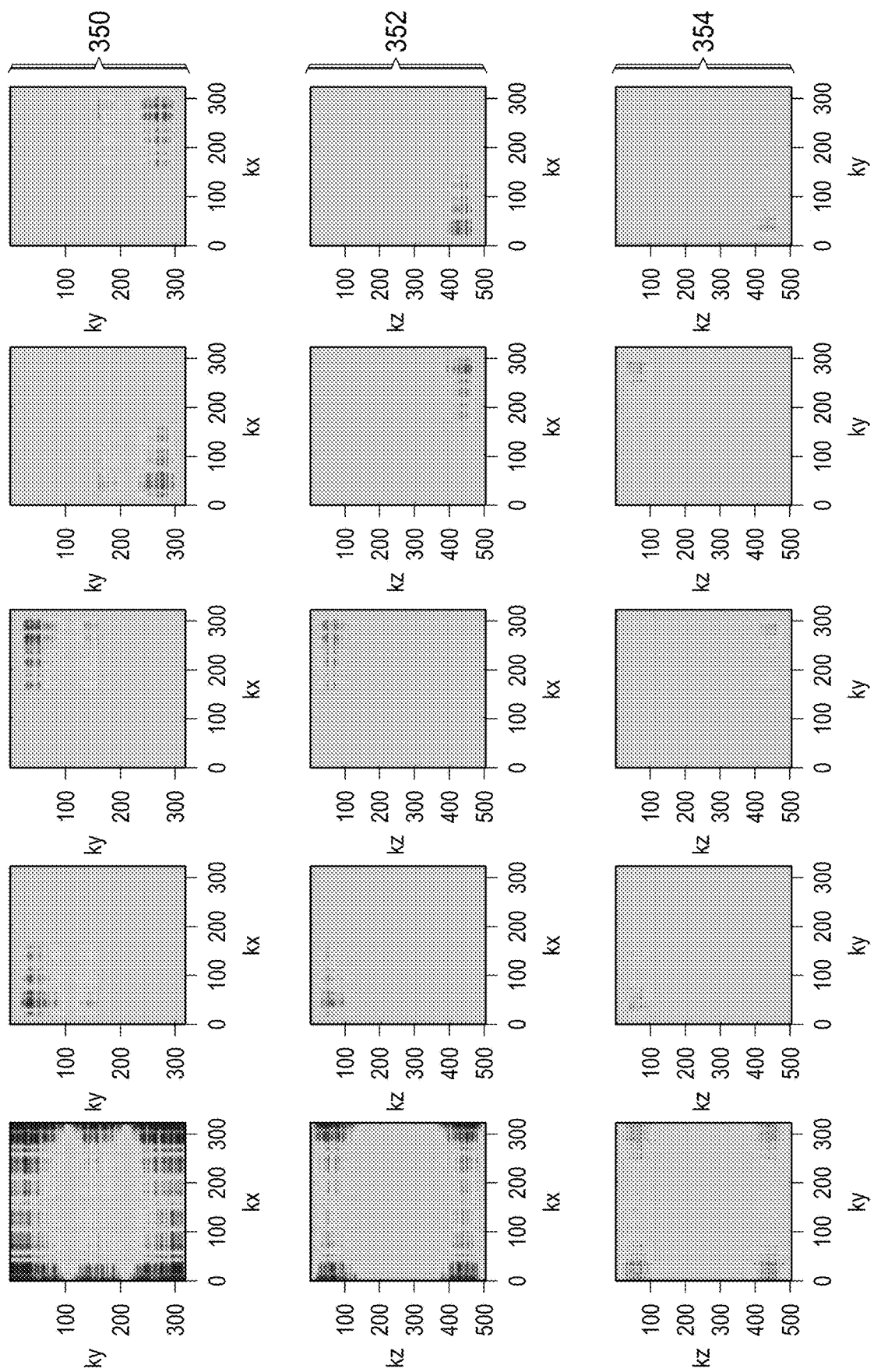
FIG. 13 shows three slices of the spectrum of the image at the locations indicated by black dots as shown in FIG. 12.

FIG. 13 shows three slices 350, 352, and 354 of the spectrum of the image at the location indicated by black dots as shown in FIG. 12. The corresponding four components are shown from the second to the fifth column of FIG. 13, including the spectrum dip of 1 (FIG. 11B), spectrum dip of 2 (FIG. 11C), spectrum dip of 3 (FIG. 11D), and the spectrum dip of 4 ((FIG. 11E), respectively. In other words, these columns represent the four different dips and azimuths of migration images. The horizontal slice of the migration image (such as the first row of FIGS. 11A-11E) shows the discontinuity. Therefore, all four components, namely, the images 340, 342, 344, and 346 have the energy at the same discontinuous location (the first and middle image in each figure). The zero-dip reflectors do not show in any of the components, because zero-dip type muting is applied. The four components of the third slice in FIGS. 11B-11E (the bottom image in each) do not show anything, because there is no discontinuity or non-zero dipping reflectors.

Figure 14:
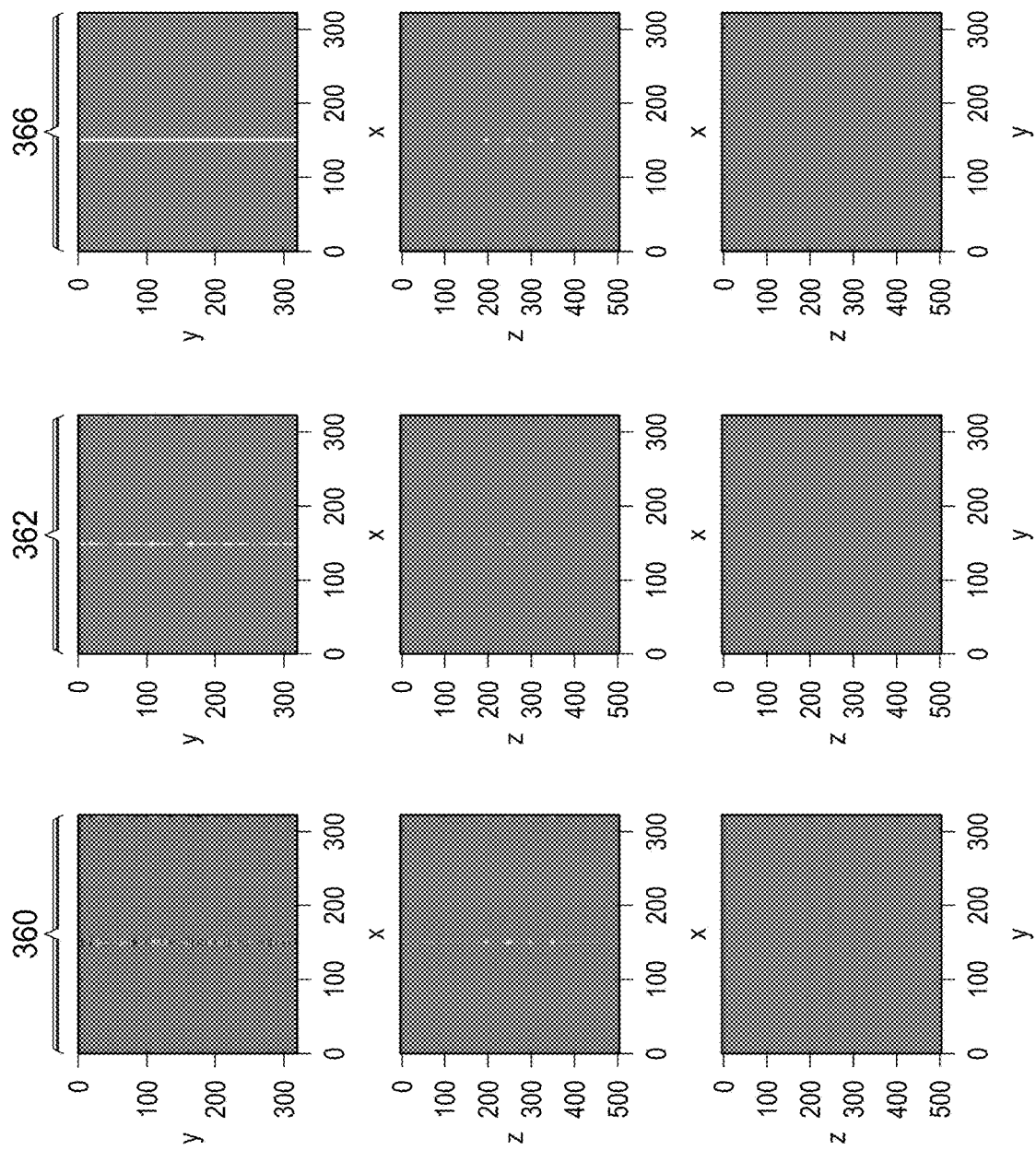
FIG. 14 shows results of the multiplication condition for the data of FIG. 11A-11E.

Turning to FIG. 14, when the data processing system 250 multiplies the four components 340, 342, 344, and 346 sample-by-sample, the common images representing the edge discontinuities remain and the non-common images representing reflectors are suppressed, as shown in the column 360. To enhance the edge detection image, the data processing system 250 applies an amplitude squared operator to yield only the positive values of the edge detection image, as shown in column 362.

The alternative strategy for the 3D post-stack edge detection imaging is splitting the data into 2D sections along the different directions, which becomes a 2D problem, as described above. Splitting along the x, y and z directions can generate three edge detection images. The combination of these three squared images (such as by summation) is shown in column 366. This result, in this example, is clearer and more continuous compared with the result obtained according to the previous strategy that is shown in column 362. For applying the 3D F-K filter according to the first approach (as shown in FIG. 4C), the data processing system 250 receives a common image that exists among the four components. However, the data processing system 250, to apply the sequence of 2D F-K filters according to the subsequent approach (partially shown in FIG. 4B), uses only two common images to generate the edge detection image. In other words, the approach of FIG. 4C has a stronger constraint than the approach of FIG. 4B. Therefore, the result of the approach including the steps of FIG. 4B includes more details of discontinuity. In addition, strategy two uses the 2D Fourier transform instead of the 3D Fourier transform, which is used in strategy one and thus saves significant computational cost.

Figure 15A:
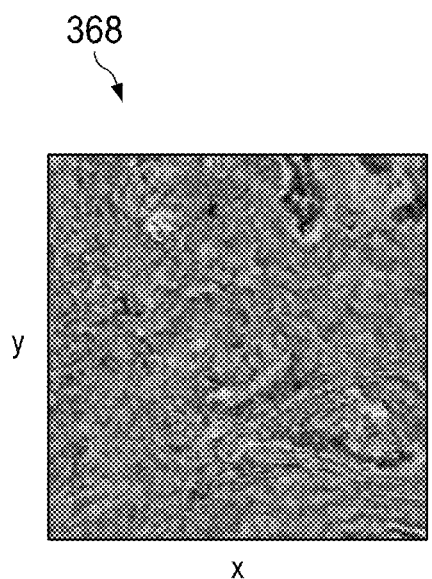
FIGS. 15A-15E show slices of a migration image and four components in the wavenumber domain for sample data.
Figure 15A:
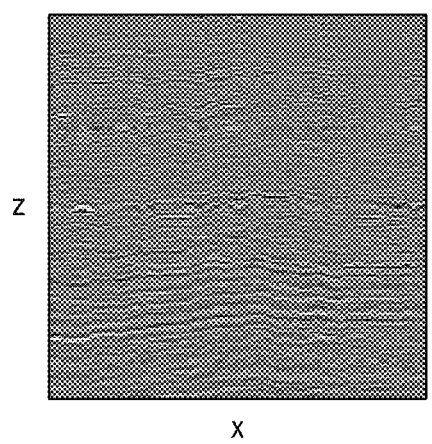
Figure 15A:
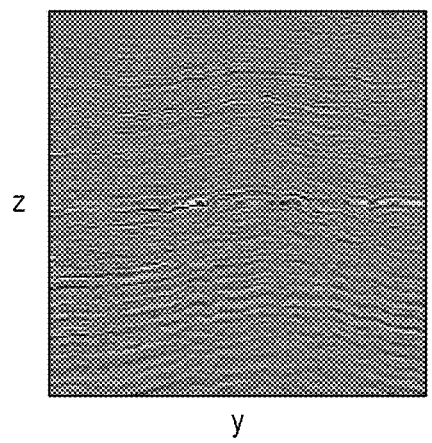
Figure 15B:
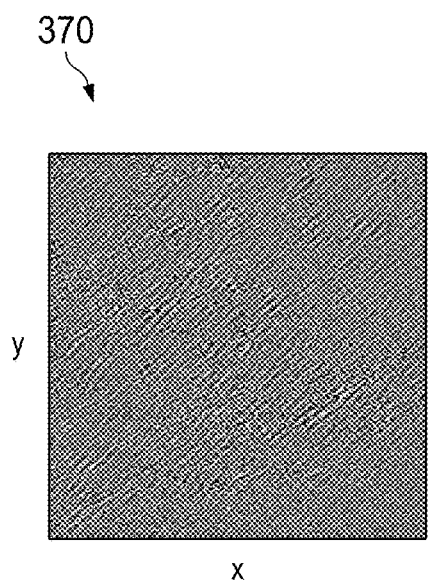
Figure 15B:
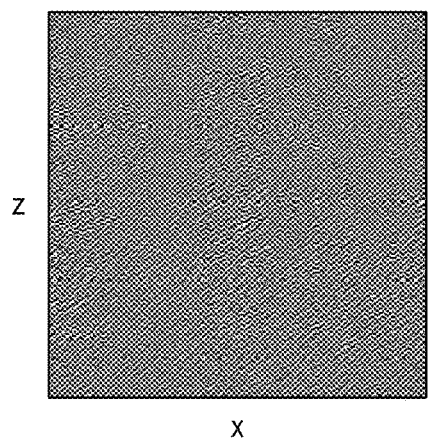
Figure 15B:
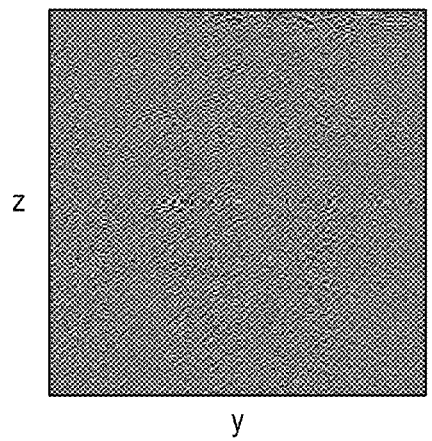
Figure 15C:
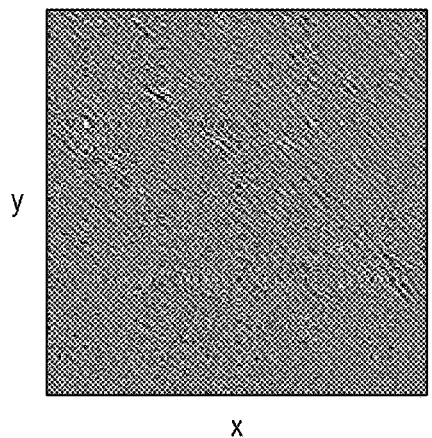
Figure 15C:
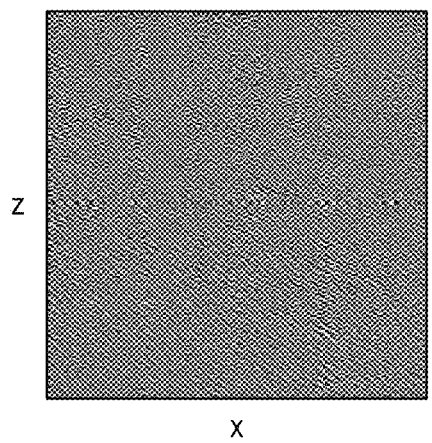
Figure 15C:
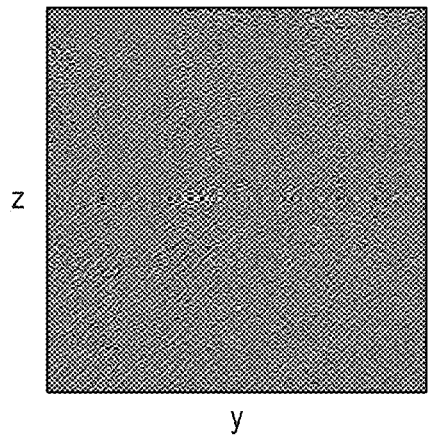
Figure 15D:
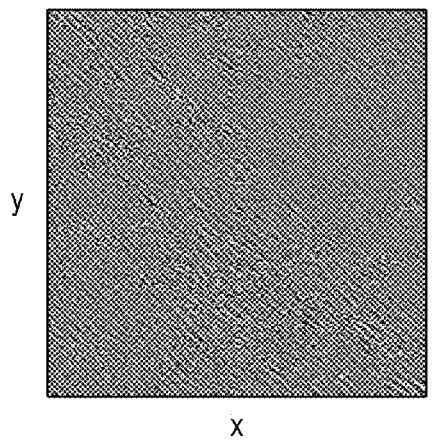
Figure 15D:
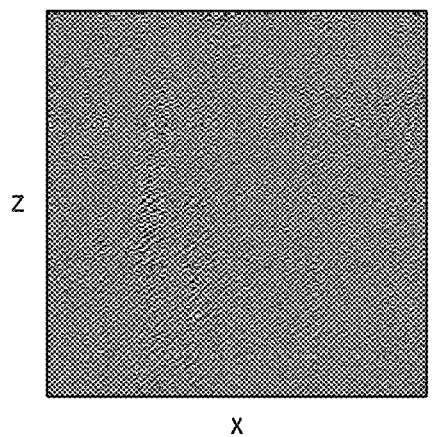
Figure 15D:
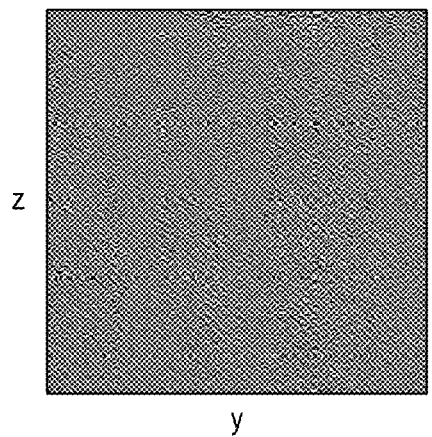
Figure 15E:
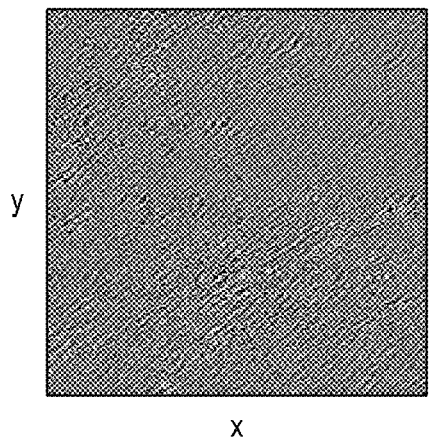
Figure 15E:
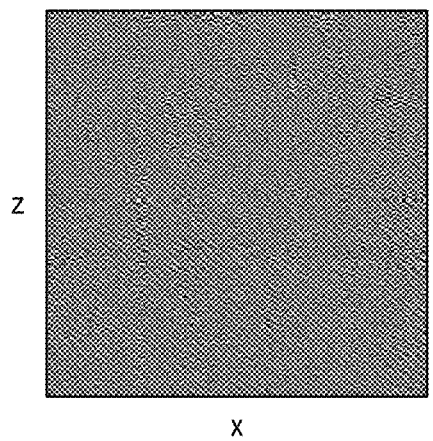
Figure 15E:
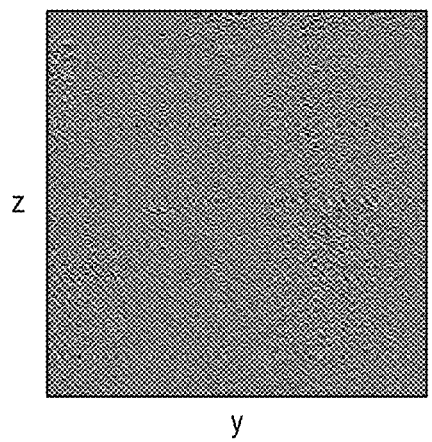

FIGS. 15A-15E show the imaging results of the 3D approaches previously described using real data, similar to the imaging results described in relation to FIGS. 11A-11E. The size nz*ny*nx of this data set is 600*1000*1000, respectively. The images 368 of FIG. 15A show the three slices of the data at the specified location. The discontinuity along the reflectors is barely visible. The edge detection imaging processes described previous can clearly show the discontinuity to assist in the interpretation. The processes 220, 240 are applied to the data of FIG. 15A. FIGS. 15B-15E represent the four components 370, 372, 374, and 376, of different dips and azimuths. Because discontinuities do exist in this example, the four components have the common image at the same location.

Figure 16A:
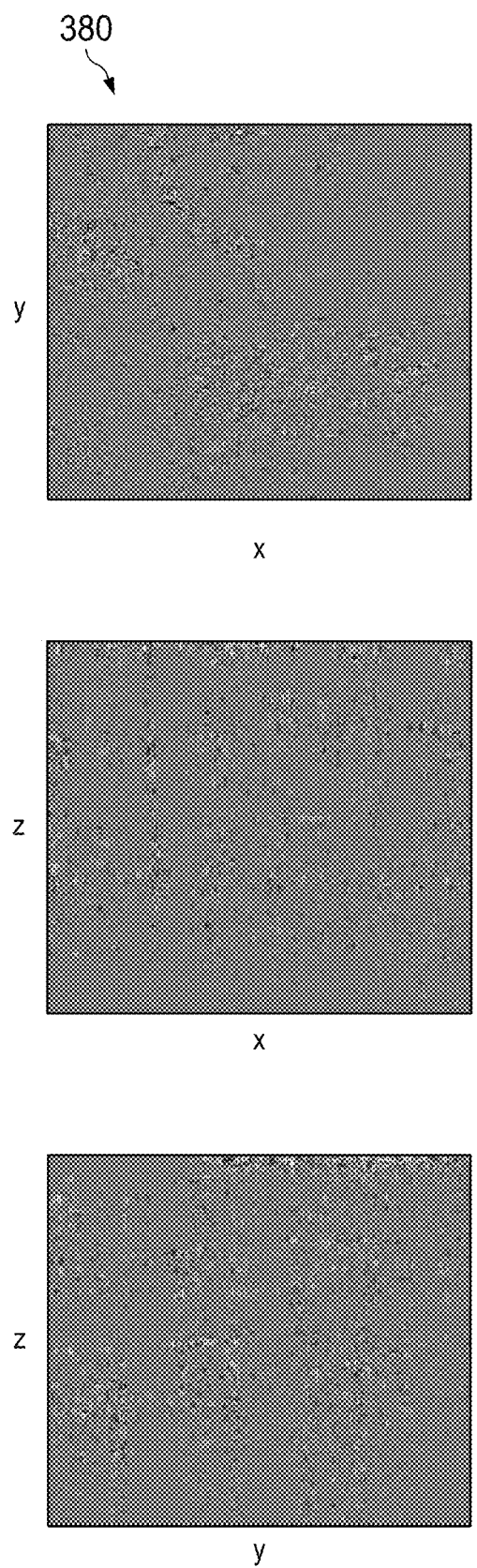
FIGS. 16A-16C show slices of edge detection images produced from the data of FIGS. 15A-15E.
Figure 16B:
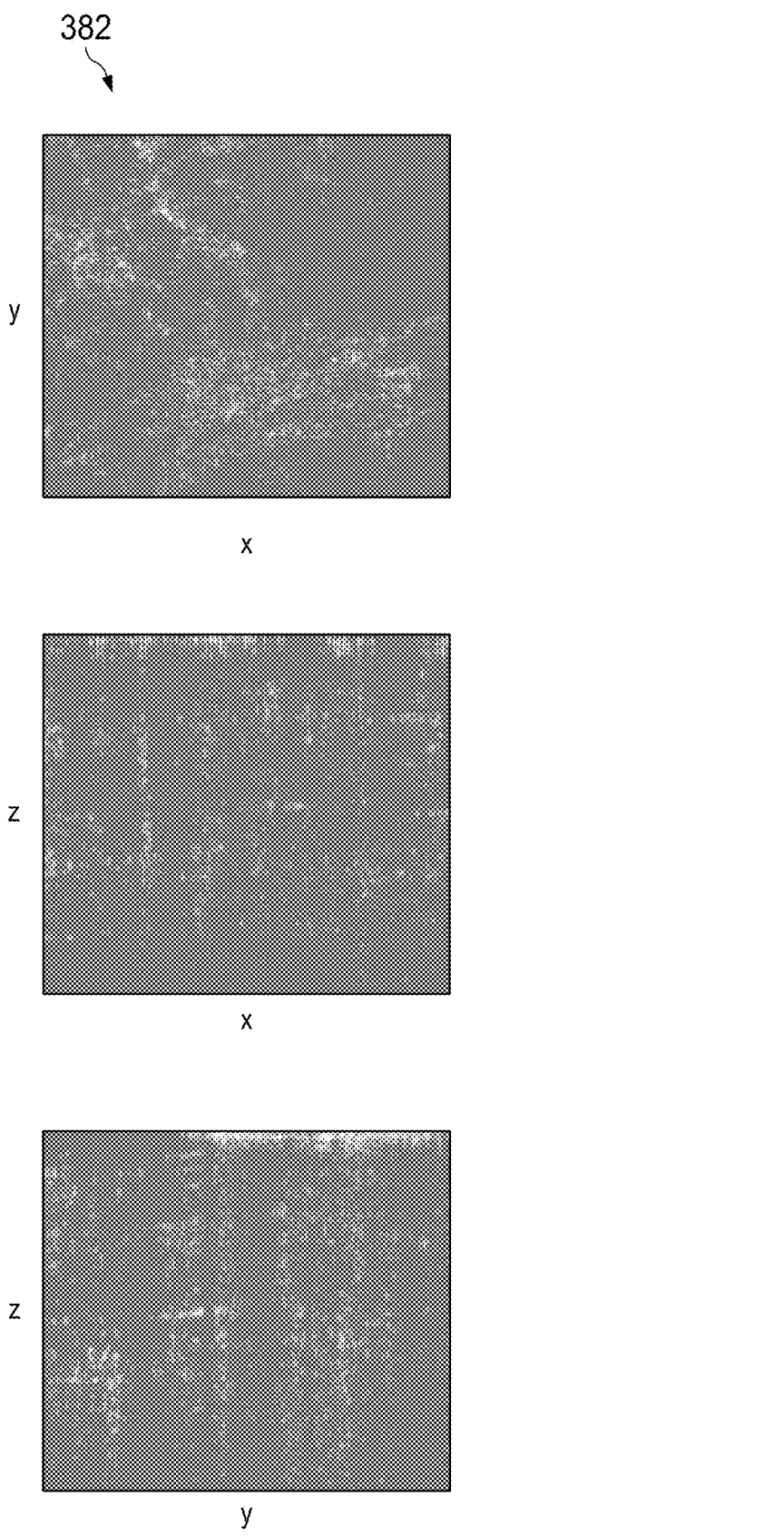
Figure 16C:
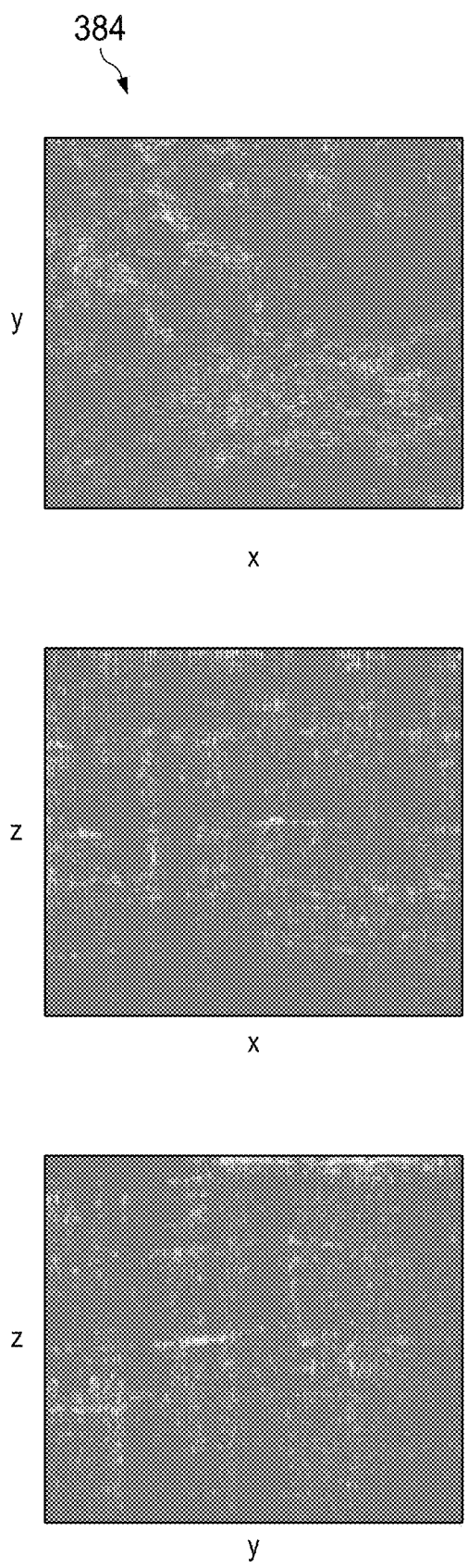

FIGS. 16A-16C show slices of edge detection images produced from the data of FIGS. 15A-15E. After applying the multiplication imaging condition as previously described, the remained edge detection image shows in the images of 380 FIG. 16A. FIG. 16B shows a squared edge detection images 382 for the results of FIG. 16A, which displays clearer details than those respective images. The edge detection image clearly shows the discontinuities, which are not obvious in the seismic migration image. FIG. 16C shows images 384 the result using an iterative version of process 220. Compared with the result of process 240, process 220 reveals more details as it was observed during the analysis of the synthetic test.

Figure 17:
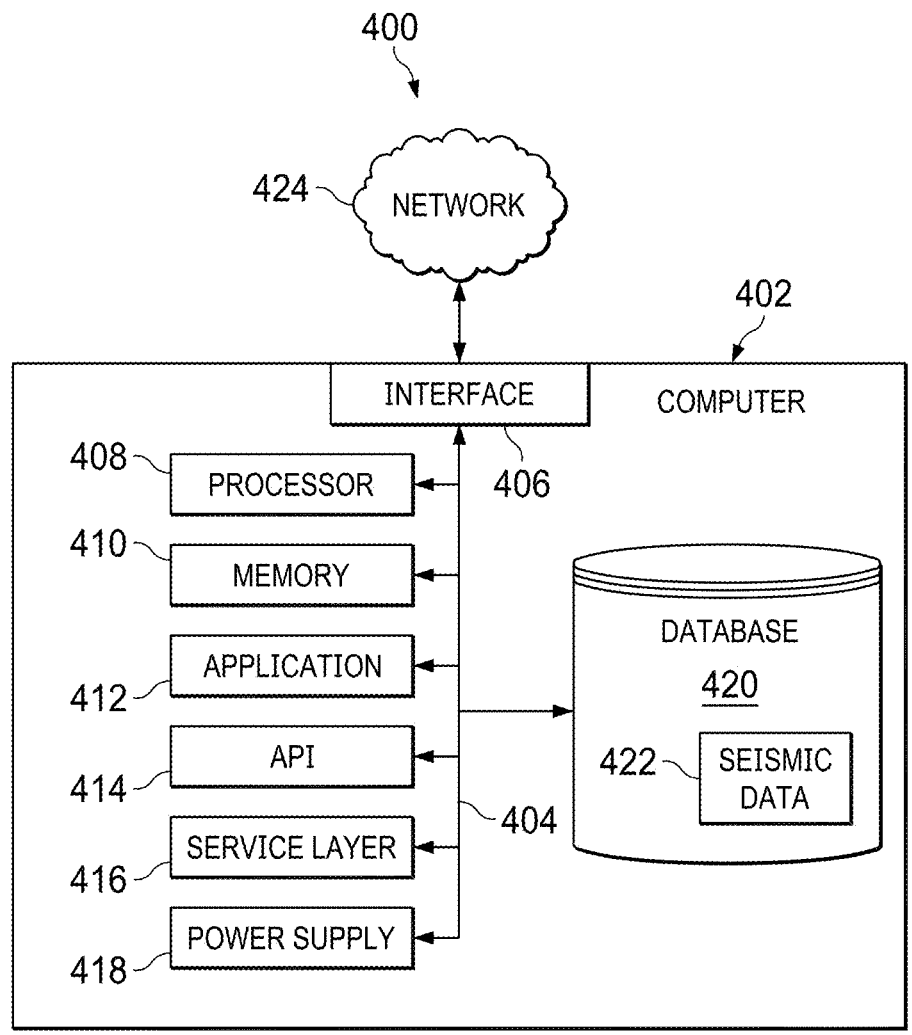
FIG. 17 is a diagram of an example computing system.

FIG. 17 is a block diagram of an example computing system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 424. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 424 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 404. In some implementations, any or all of the components of the computer 402, including hardware or software components, can interface with each other or the interface 406 (or a combination of both), over the system bus 404. Interfaces can use an application programming interface (API) 414, a service layer 416, or a combination of the API 414 and service layer 416. The API 414 can include specifications for routines, data structures, and object classes. The API 414 can be either computer-language independent or dependent. The API 414 can refer to a complete interface, a single function, or a set of APIs.

The service layer 416 can provide software services to the computer 402 and other components (whether illustrated or not) that are communicably coupled to the computer 402.

The functionality of the computer 402 can be accessible for all service consumers using this service layer. Software services, such as those provided by the service layer 416, can provide reusable, defined functionalities through a defined interface. For example, the interface can be software written in JAVA, C++, or a language providing data in extensible markup language (XML) format. While illustrated as an integrated component of the computer 402, in alternative implementations, the API 414 or the service layer 416 can be stand-alone components in relation to other components of the computer 402 and other components communicably coupled to the computer 402. Moreover, any or all parts of the API 414 or the service layer 416 can be implemented as child or sub-modules of another software module, enterprise application, or hardware module without departing from the scope of the present disclosure.

The computer 402 includes an interface 406. Although illustrated as a single interface 406 in FIG. 17, two or more interfaces 406 can be used according to particular needs, desires, or particular implementations of the computer 402 and the described functionality. The interface 406 can be used by the computer 402 for communicating with other systems that are connected to the network 424 (whether illustrated or not) in a distributed environment. Generally, the interface 406 can include, or be implemented using, logic encoded in software or hardware (or a combination of software and hardware) operable to communicate with the network 424. More specifically, the interface 406 can include software supporting one or more communication protocols associated with communications. As such, the network 424 or the hardware of the interface can be operable to communicate physical signals within and outside of the illustrated computer 402.

The computer 402 includes a processor 408. Although illustrated as a single processor 408 in FIG. 17, two or more processors 408 can be used according to particular needs, desires, or particular implementations of the computer 402 and the described functionality. Generally, the processor 408 can execute instructions and can manipulate data to perform the operations of the computer 402, including operations using algorithms, methods, functions, processes, flows, and procedures as described in the present disclosure.

The computer 402 also includes a database 420 that can hold data (for example, seismic data 422) for the computer 402 and other components connected to the network 424 (whether illustrated or not). For example, database 420 can be an in-memory, conventional, or a database storing data consistent with the present disclosure. In some implementations, database 420 can be a combination of two or more different database types (for example, hybrid in-memory and conventional databases) according to particular needs, desires, or particular implementations of the computer 402 and the described functionality. Although illustrated as a single database 420 in FIG. 17, two or more databases (of the same, different, or combination of types) can be used according to particular needs, desires, or particular implementations of the computer 402 and the described functionality. While database 420 is illustrated as an internal component of the computer 402, in alternative implementations, database 420 can be external to the computer 402.

The computer 402 also includes a memory 410 that can hold data for the computer 402 or a combination of components connected to the network 424 (whether illustrated or not). Memory 410 can store any data consistent with the present disclosure. In some implementations, memory 410 can be a combination of two or more different types of memory (for example, a combination of semiconductor and magnetic storage) according to particular needs, desires, or particular implementations of the computer 402 and the described functionality. Although illustrated as a single memory 410 in FIG. 17, two or more memories 410 (of the same, different, or combination of types) can be used according to particular needs, desires, or particular implementations of the computer 402 and the described functionality. While memory 410 is illustrated as an internal component of the computer 402, in alternative implementations, memory 410 can be external to the computer 402.

The application 412 can be an algorithmic software engine providing functionality according to particular needs, desires, or particular implementations of the computer 402 and the described functionality. For example, application 412 can serve as one or more components, modules, or applications. Further, although illustrated as a single application 412, the application 412 can be implemented as multiple applications 412 on the computer 402. In addition, although illustrated as internal to the computer 402, in alternative implementations, the application 412 can be external to the computer 402.

The computer 402 can also include a power supply 418. The power supply 418 can include a rechargeable or non-rechargeable battery that can be configured to be either user- or non-user-replaceable. In some implementations, the power supply 418 can include power-conversion and management circuits, including recharging, standby, and power management functionalities. In some implementations, the power-supply 418 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 424. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 402.11 a/b/g/n or 402.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system previously described. Accordingly, other embodiments are within the scope of the following claims.

What is claimed is:

1. A system for seismic imaging of a subterranean geological formation, the system comprising:
at least one processor; and
a memory storing instructions that, when executed by the at least one processor, cause the at least one processor to:
obtain seismic data comprising a data volume representing a post-stacked image;
apply frequency-wavenumber (F-K) filter to the data volume extract a negative-dip structure image; and
apply the frequency-wavenumber (F-K) filter to the data volume extract a positive-dip structure image, wherein the F-K filter comprises a two dimensional (2D) F-K filter;
iteratively apply the 2D F-K filter to a plurality of slices of a three dimensional data volume; and
multiply the positive-dip structure image with the negative-dip structure image to generate a component image; and
generate, based on the generated component image, a diffraction-enhanced seismic image representing a geological formation of the data volume;

wherein iteratively applying the 2D F-K filter to a plurality of slices of a three dimensional data volume comprises:
  splitting the data volume along an x-axis, a y-axis, and a z-axis into three portions;
  applying the 2D F-K filter to each portion of the three portions; and
  summing the three portions for generation of the diffraction-enhanced seismic image.

2. The system of claim 1, wherein the F-K filter comprises a three dimensional (3D) F-K filter, wherein the filtering module is configured to:
  extract a common image that exists among four dip components of the data volume;
  apply the 3D F-K filter to extract a first component image from the data volume;
  apply the 3D F-K filter to extract a second component image from the data volume;
  apply the 3D F-K filter to extract a third component image from the data volume;
  apply the 3D F-K filter to extract a fourth component image from the data volume; and
  wherein the diffraction rendering module configured to:
  multiply the first component image, the second component image, the third component image, and the fourth component image; and to generate the diffraction-enhanced seismic image representing a geological formation of the data volume.

3. The system of claim 1, wherein generating the diffraction-enhanced seismic image is independent from separating reflection portions from diffraction portions of the seismic data.

4. The system of claim 1, wherein the diffraction-enhanced seismic image comprises an increased field of illumination with respect to a seismic image generated independent from multiplying the positive-dip imaging condition and the negative-dip imaging condition.

5. The system of claim 1, wherein the diffraction rendering module is configured to render the diffraction-enhanced seismic image for presentation on a user interface.

6. A method for seismic imaging of a subterranean geological formation, the method comprising:
  obtaining seismic data comprising a data volume representing a post-stacked image;
  applying a frequency-wavenumber (F-K) filter to the data volume extract a negative-dip structure image;
  applying the frequency-wavenumber (F-K) filter to the data volume extract a positive-dip structure image,
  wherein the F-K filter comprises a two dimensional (2D) F-K filter;
  iteratively applying the 2D F-K filter to a plurality of slices of a three dimensional data volume;
  multiplying the positive-dip structure image with the negative-dip structure image to generate a component image; and
  generating, based on the generated component image, a diffraction-enhanced seismic image representing a geological formation of the data volume;
  wherein iteratively applying the 2D F-K filter to a plurality of slices of a three dimensional data volume comprises:
  splitting the data volume along an x-axis, a y-axis, and a z-axis into three portions;
  applying the 2D F-K filter to each portion of the three portions; and
  summing the three portions for generation of the diffraction-enhanced seismic image.

7. The method of claim 6, wherein the F-K filter comprises a three dimensional (3D) F-K filter, and wherein the method further comprises:
  extracting, by the filtering module, a common image that exists among four dip components of the data volume;
  applying, by the filtering module, the 3D F-K filter to extract a first component image from the data volume;
  applying, by the filtering module, the 3D F-K filter to extract a second component image from the data volume;
  applying, by the filtering module, the 3D F-K filter to extract a third component image from the data volume;
  applying, by the filtering module, the 3D F-K filter to extract a fourth component image from the data volume;
  multiplying, by the diffraction rendering module, the first component image, the second component image, the third component image, and the fourth component image to generate the diffraction-enhanced seismic image representing a geological formation of the data volume.

8. The method of claim 6, wherein generating the diffraction-enhanced seismic image is independent from separating reflection portions from diffraction portions of the seismic data.

9. The method of claim 6, wherein the diffraction-enhanced seismic image comprises an increased field of illumination with respect to a seismic image generated independent from multiplying the positive-dip imaging condition and the negative-dip imaging condition.

10. The method of claim 6, wherein the diffraction rendering module is configured to render the diffraction-enhanced seismic image for presentation on a user interface.

11. One or more non-transitory computer readable media storing instructions that, when executed by at least one processing device, are configured to cause the at least one processing device to perform operations for seismic imaging of a subterranean geological formation, the operations comprising:
  obtaining seismic data comprising a data volume representing a post-stacked image;
  applying a frequency-wavenumber (F-K) filter to the data volume extract a negative-dip structure image;
  applying the frequency-wavenumber (F-K) filter to the data volume extract a positive-dip structure image,
  wherein the F-K filter comprises a two dimensional (2D) F-K filter;
  iteratively applying the 2D F-K filter to a plurality of slices of a three dimensional data volume;
  multiplying the positive-dip structure image with the negative-dip structure image to generate a component image; and
  generating, based on the generated component image, a diffraction-enhanced seismic image representing a geological formation of the data volume;
  wherein iteratively applying the 2D F-K filter to a plurality of slices of a three dimensional data volume comprises:
  splitting the data volume along an x-axis, a y-axis, and a z-axis into three portions;
  applying the 2D F-K filter to each portion of the three portions; and
  summing the three portions for generation of the diffraction-enhanced seismic image.

12. The one or more non-transitory computer readable media of claim 11, wherein the F-K filter comprises a three dimensional (3D) F-K filter, and wherein the method further comprises:
- extracting a common image that exists among four dip components of the data volume;
- applying the 3D F-K filter to extract a first component image from the data volume;
- applying the 3D F-K filter to extract a second component image from the data volume;
- applying the 3D F-K filter to extract a third component image from the data volume;
- applying the 3D F-K filter to extract a fourth component image from the data volume;
- multiplying the first component image, the second component image, the third component image, and the fourth component image to generate the diffraction-enhanced seismic image representing a geological formation of the data volume.

13. The one or more non-transitory computer readable media of claim 11, wherein generating the diffraction-enhanced seismic image is independent from separating reflection portions from diffraction portions of the seismic data.

14. The one or more non-transitory computer readable media of claim 11, wherein the diffraction-enhanced seismic image comprises an increased field of illumination with respect to a seismic image generated independent from multiplying the positive-dip imaging condition and the negative-dip imaging condition.

* * * * *